United States Patent [19]

Hemstreet

[11] 3,713,099

[45] Jan. 23, 1973

[54] METHOD AND APPARATUS FOR IDENTIFYING LETTERS, CHARACTERS, SYMBOLS AND THE LIKE

[75] Inventor: Harold S. Hemstreet, Binghamton, N.Y.

[73] Assignee: Character Recognition Corporation

[22] Filed: Aug. 4, 1959

[21] Appl. No.: 831,599

Related U.S. Application Data

[62] Division of Ser. No. 336,080, Feb. 10, 1953.

[52] U.S. Cl...340/146.3 D, 340/149 R, 340/146.3 C, 340/146.3 Y, 340/146.3 S, 340/146.3 T

[51] Int. Cl. .......................................... G06r 9/00

[58] Field of Search.........340/149, 149 A, 164, 318, 340 146.3, 169, 174.1, 166, 347, 175; 209/101; 178/15, 30, 4, 6.6, 6.7, 13, 33; 179/100.3, 219; 250/235, 220, 209; 346/1; 235/61.12, 61.11, 61.6; 234/70, 56, 33; 40/53; 101/93

[56] References Cited

UNITED STATES PATENTS

| | | | |
|---|---|---|---|
| 1,117,184 | 11/1914 | Goldberg | 178/30 |
| 1,165,663 | 12/1915 | Goldberg | 178/30 |
| 1,815,986 | 7/1931 | Parker | 178/4 |
| 1,815,996 | 7/1931 | Weaver | 178/4 |
| 1,828,198 | 10/1931 | Naumburg | 250/235 |
| 1,838,389 | 12/1931 | Goldberg | 346/1 |
| 1,853,443 | 4/1932 | Maul | 235/61.12 |
| 1,915,993 | 6/1933 | Handel | 235/61.11 |
| 2,000,403 | 5/1935 | Maul | 235/61.11 |
| 2,026,329 | 12/1935 | Tauschek | 235/61.6 |
| 2,039,406 | 4/1936 | Greensfelder | 178/6.6 |
| 2,063,481 | 12/1936 | Bryce | 234/70 |
| 2,115,563 | 4/1938 | Tauschek | 235/61.6 |
| 2,124,906 | 7/1938 | Bryce | 40/53 |
| 2,131,911 | 10/1938 | Ayres | 250/220 |
| 2,209,106 | 7/1940 | Brand | 234/56 |
| 2,209,107 | 7/1940 | Brand | 234/56 |
| 2,210,706 | 7/1940 | Carlisle | 178/13 |
| 2,228,782 | 1/1941 | Sharples | 179/100.3 |
| 2,231,186 | 2/1941 | Gould | 250/209 |
| 2,240,544 | 5/1941 | Bryce | 235/61.11 |
| 2,240,545 | 5/1941 | Bryce | 235/61.11 |
| 2,240,546 | 5/1941 | Bryce | 235/61.11 |
| 2,518,694 | 4/1951 | Jannopoulo | 179/1 |
| 2,244,257 | 6/1941 | Maul | 340/347 |
| 2,615,992 | 10/1952 | Flory et al. | 35/35 |
| 2,616,983 | 11/1952 | Zworykin et al. | 179/100.3 |
| 2,261,542 | 11/1941 | Dickinson | 235/61.11 |
| 2,663,758 | 12/1953 | Shepard | 178/17 |
| 2,679,636 | 5/1954 | Hillyer | 340/149 |
| 2,265,418 | 12/1941 | Brand | 235/61.6 |
| 2,682,043 | 6/1954 | Fitch | 340/147 |
| 2,738,499 | 3/1956 | Sprick | 340/345 |
| 2,265,445 | 12/1941 | Paris | 101/93 |
| 2,741,312 | 4/1956 | Johnson | 234/56 |
| 2,838,602 | 6/1958 | Sprick | 178/15 |
| 2,275,396 | 3/1942 | Johnson | 234/33 |
| 3,469,263 | 9/1969 | King | 340/146.3 |
| 2,285,296 | 5/1942 | Maul | 235/61.11 |
| 2,362,004 | 11/1944 | Heidinger | 235/61.6 |
| 2,399,720 | 5/1946 | Brand et al. | 178/33 |
| 2,458,030 | 1/1949 | Rea | 340/175 |
| 2,517,102 | 4/1951 | Flory | 179/1 |

*Primary Examiner*—Thomas A. Robinson
*Attorney*—Richard G. Stephens

EXEMPLARY CLAIM

Character recognition apparatus, comprising, in combination: means for scanning characters to be identified to provide for each character to be identified a time-varying first signal comprising a serial sequence of electrical signal pulses; serial-to-parallel conversion means responsive to each said serial sequence of electrical signal pulses and operable to provide a first parallel multi-bit digital electrical signal, said conversion means including a digital temporary storage means; a multiplicity of matching circuits, each of said matching circuits being associated with a respective character of a set of characters said apparatus is designed to recognize; means for applying each said first parallel multi-bit digital electrical signal to each of said matching circuits, each of said matching circuits having an electrical characteristic for providing, upon receipt of each said first parallel multi-bit digital electrical signal, a first respective analog output signal having a magnitude which varies as a function of the degree of match between the character scanned and its respective associated character of said set; and comparison means responsive to said first analog output signals from said matching circuits for determining if said analog output signals do not differ from reference values by more than a tolerance for providing an indication of the character scanned.

96 Claims, 20 Drawing Figures

United States Patent [19]
Hemstreet
[11] 3,713,099
[45] Jan. 23, 1973
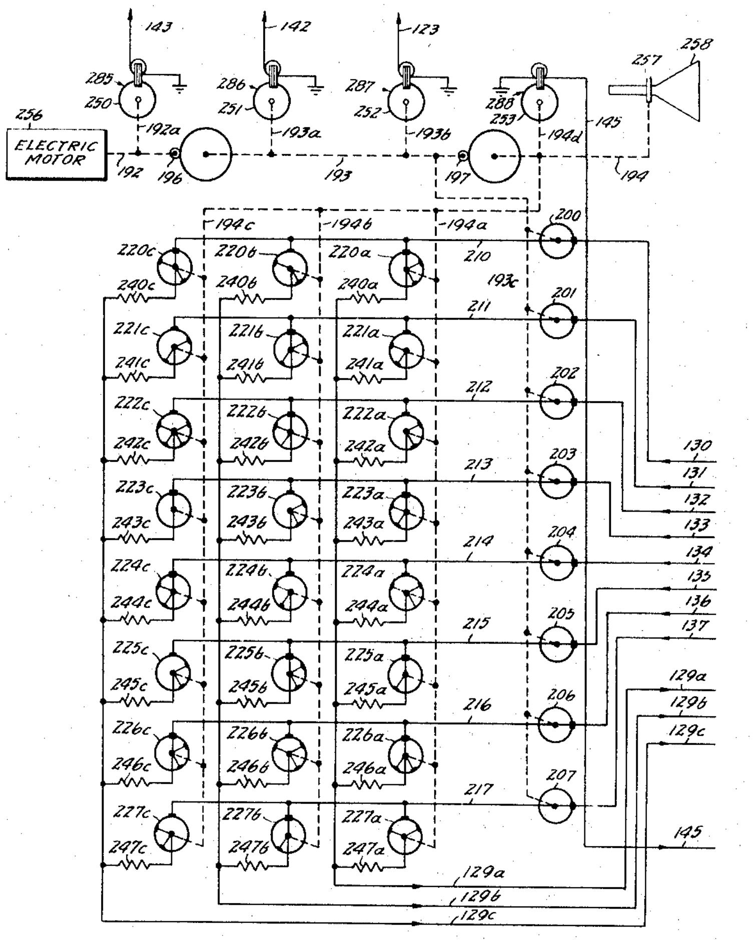

METHOD AND APPARATUS FOR IDENTIFYING LETTERS, CHARACTERS, SYMBOLS AND THE LIKE

This invention, which has been divided from my copending application, Ser. No. 336,080, filed Feb. 10, 1953, relates to identification methods and apparatus and particularly to electro-mechanical methods and means for the identification of graphic data. In certain of its aspects, moreover, it relates to devices for counting electrical pulses and for determining lack of coincidence in electrical impulses. In its more specific aspects, it relates to devices of the general character of those known as "reading" devices and to elements thereof.

There is a wide need for devices which can efficiently and effectively identify letters, numerals, marks, symbols, fingerprints, and a wide number of other graphic data, which can set up specific reactions to individual ones thereof, which can recognize the similarity of similar graphic data, and/or which can otherwise utilize its "reading" ability. Methods and machines of such nature are utilizable in such widely different fields as feeders for computing machines and as means to check the similarity of a thumb-print just made with a thumb print on file to prevent unauthorized access to an industrial plant or a military installation.

With the foregoing and other considerations in view, I have provided methods and apparatus whereby graphic data may be identified, and/or comparisons made, rapidly and accurately. Pursuant to my invention, graphic data may be readily identified whether typewritten, printed, engraved, photographically produced, or otherwise formed; whether mechanically, manually, photographically or otherwise produced; and whether or not visible to the naked eye; just so long as this data is discernable under the type of electro-magnetic radiation known by the term "light" in its most general sense. As will become more apparent as the description proceeds, the invention is applicable to the identification of any symbol or item of indicia contained on a background surface where such indicia has a contrasting energy-reflective property or other contrasting physical property which allows a scanning system to discern whether indicia area or background area is being scanned at any instant. Television camera tubes and other photo-tubes are usable for this purpose, as well as devices popularly called "electric eyes." While various types of apparatus for responding to various geometric codes are well known, including, for example, Hollerith, "Flexowriter," and ASCII codes, and while groups of holes or dots or the like used with such codes are sometimes called characters or patterns, the present invention is instead concerned with automatic or machine recognition of lines or shapes or groups thereof which are generally human-recognizable.

In one form herein illustrated, the invention comprises broadly the following steps:

A. Producing an electrical quantity representative of an array of impulses characteristic of an item to be examined.

B. Comparing that quantity with a norm or pattern, previously or simultaneously determined.

C. Rejecting the item if the quantity differs from the norm to a degree exceeding a desired tolerance previously adopted.

Pursuant to the invention, a scanning device may be employed to effectuate an electrical flow, responsive piece-by-piece, to different small fragments or bits of a graphic datum being scanned. Any of the various scanning devices used in television broadcasting are adaptable for use in accordance with the invention. The photo-electrical results of such scanning may be used to form a record for future comparison, or may be compared with a record previously made, or may be utilized in other desirable ways for identification.

The invention further contemplates the provision of various procedures, apparatus, mechanisms, electrical arrangements, and the like, whereby the identification of graphic data may be carried out or facilitated.

The invention accordingly comprises the several steps and the relation and order of one or more of such steps with respect to each of the others, and the apparatus embodying features of construction, combination of elements and arrangements of parts which are adapted to effect such steps, all as exemplified in the following disclosure, and the scope of the application of which will be indicated in the claims.

For a fuller understanding of the nature and objects of the invention, reference should be had to the following detailed description taken in connection with the accompanying drawings, in which FIG. 1 is a diagrammatic view illustrating a procedural sequence which may be followed, and a type of arrangement of devices which may be used in carrying out the invention of my abovementioned copending application some of the devices of which are used in the instant invention;

FIGS. 2, 2*a*, and 2*b* are somewhat diagrammatic showings of an operation of the scanning means;

Figures 9, 10, 10A:
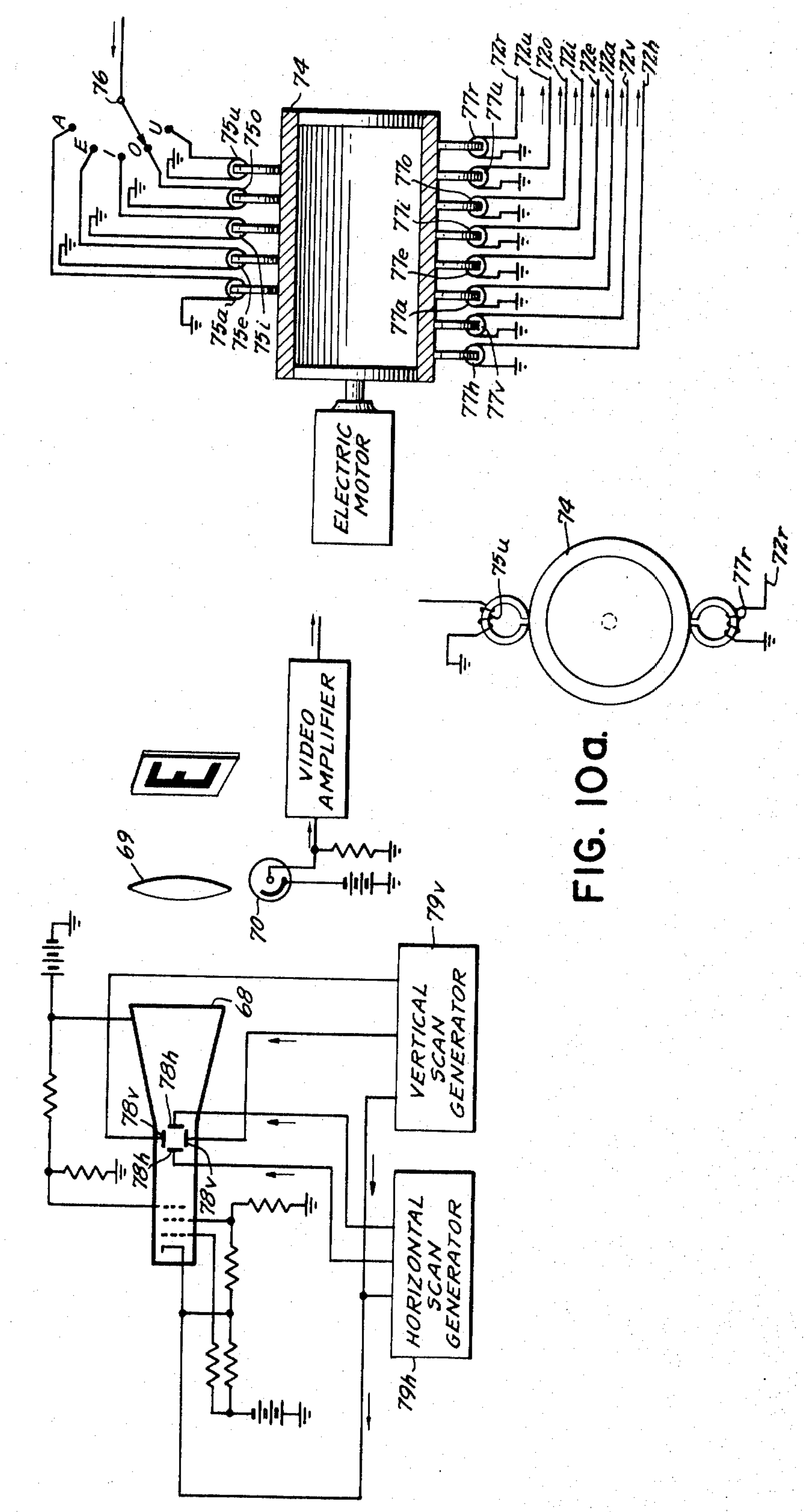
FIG. 9 shows a scanning device which may be used.
FIG. 10 is a diagram of a memory device as applied to the invention of my abovementioned copending application.
Figure 11:
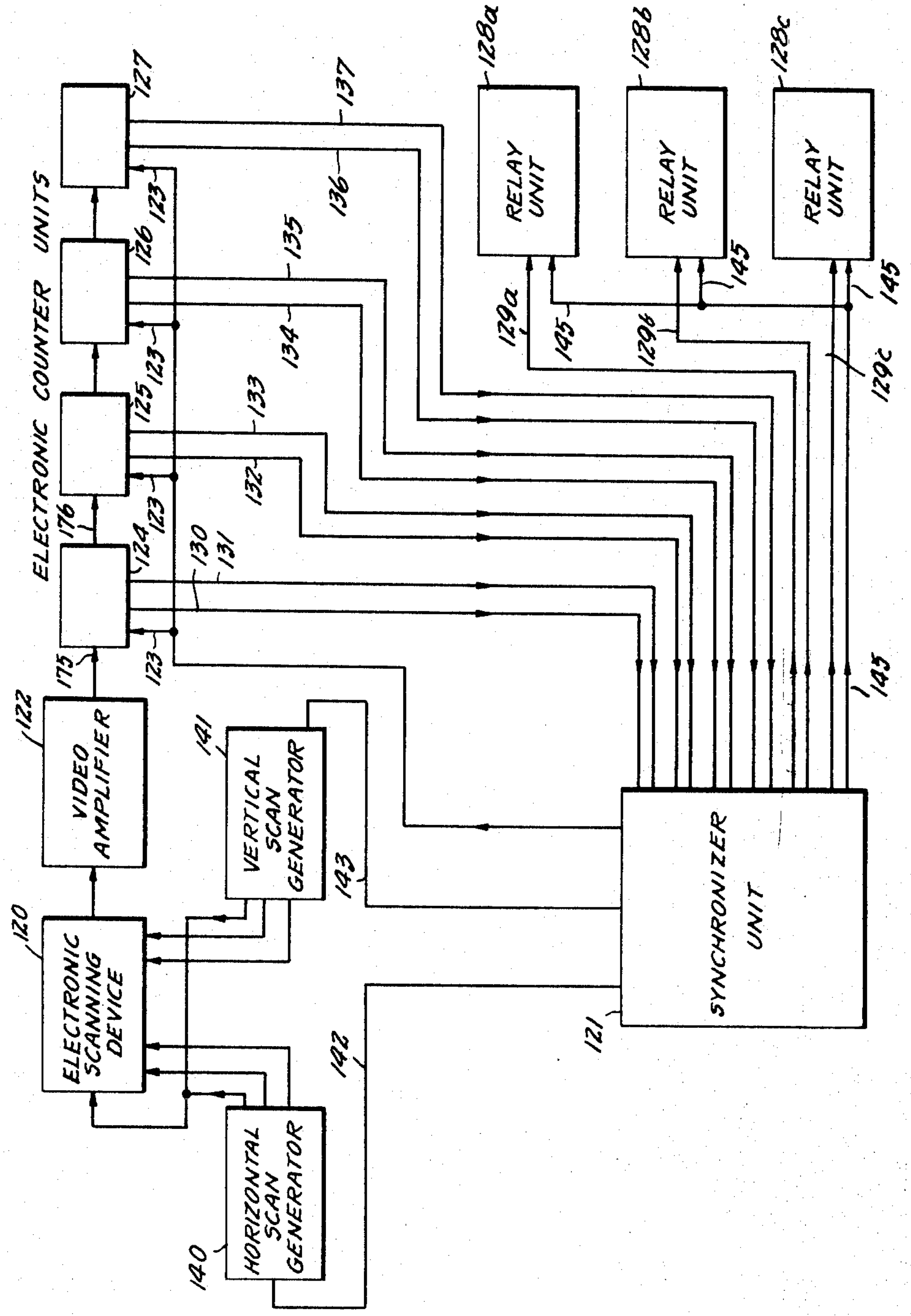

FIG. 10*a* is a right-hand end view of FIG. 10;

FIG. 11 is an embodiment in accordance with the instant invention which does not require a memory device of the type shown in FIGS. 10 and 10*a*.

Figure 12:
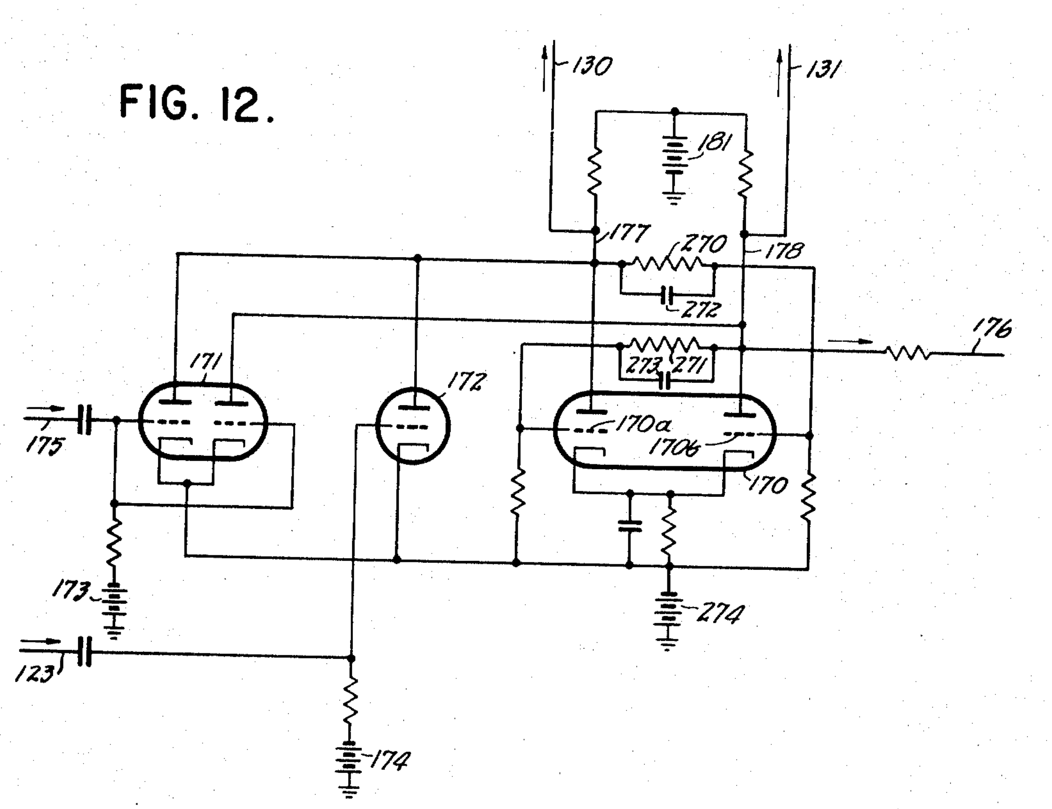
Figure 13:
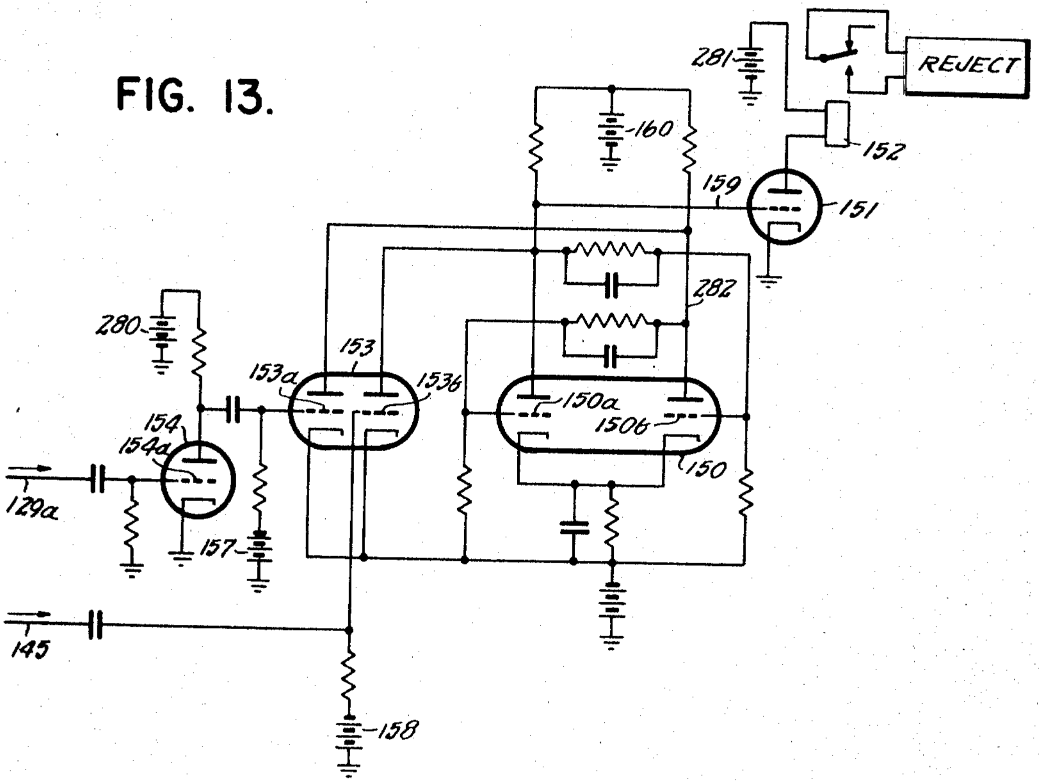

FIG. 12 is a diagram showing the construction of one of the identical electronic counter units of FIG. 11;

FIG. 13 is a diagram showing the construction of one of the identical relay units of FIG. 11.

Figure 14:
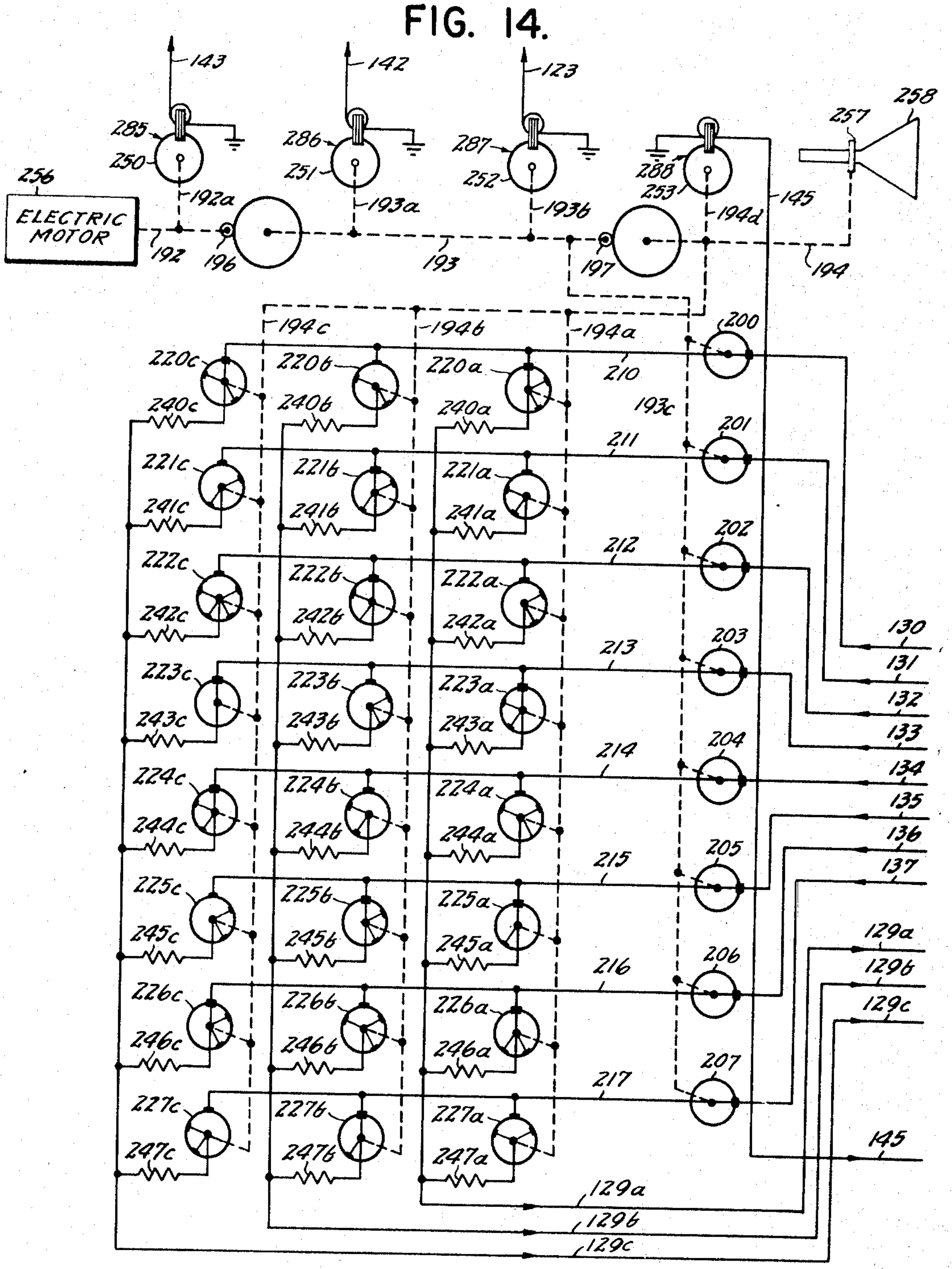
Figure 14B:
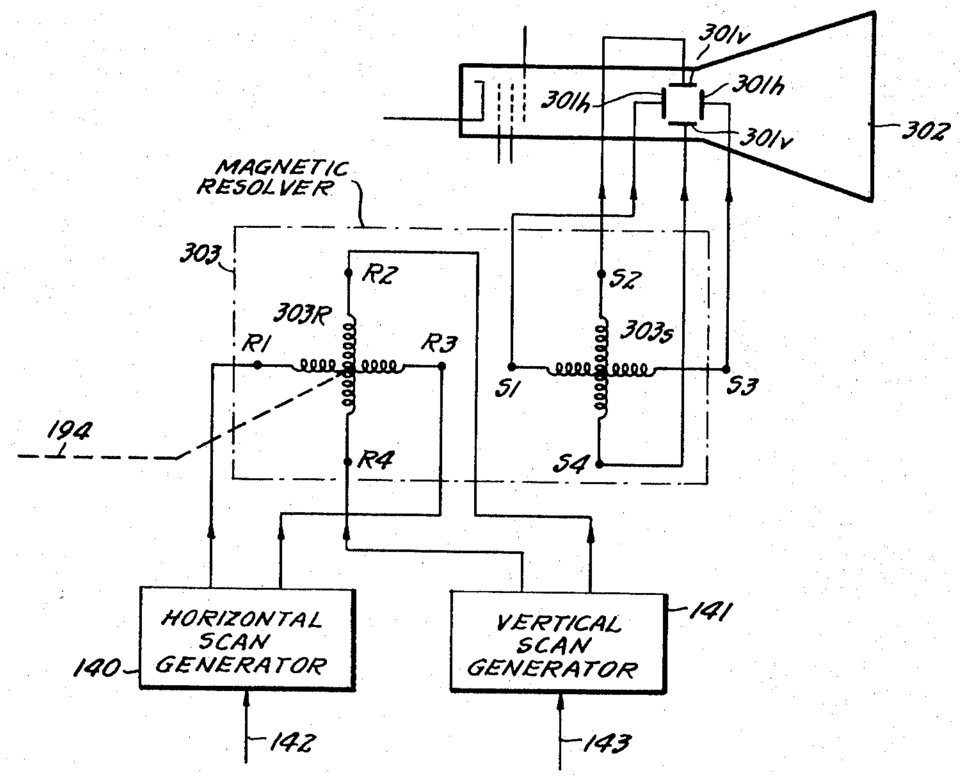
Figure 14A:
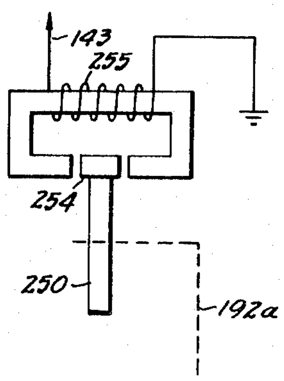
Figure 15:
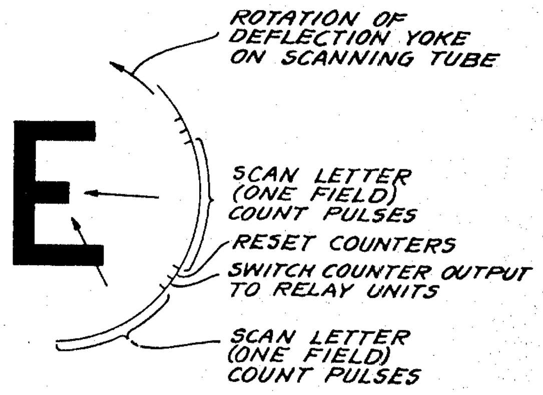

FIG. 14 is a schematic diagram of the synchronizer unit of FIG. 11;

FIG. 14*a* is a detail view of a wheel and magnet shown in FIG. 14;

FIG. 14*b* shows an arrangement usable with the arrangement shown in FIG. 14; and FIG. 15 shows the time sequence of events as the scanning yoke is rotated in the system employing multiple scanning.

Figure 1:
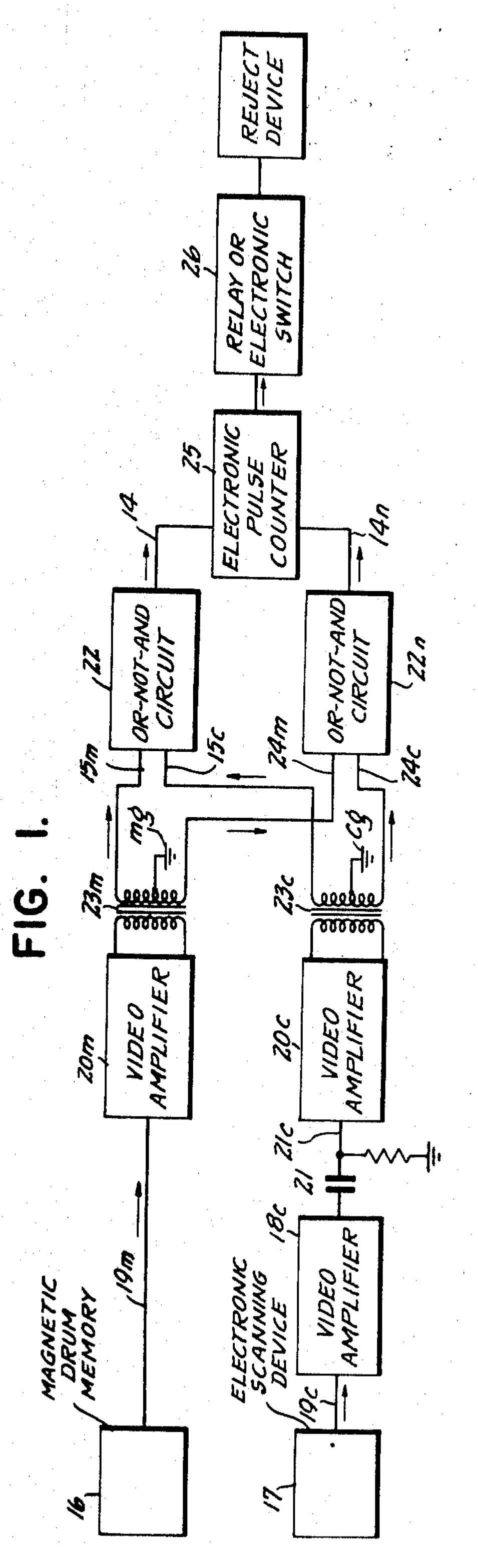

The invention of my abovementioned copending application is exemplified in the construction diagrammatically shown in FIG. 1. It contemplates, first, scanning the datum or reference pattern in such a manner as to produce an electrical pulse train herein referred to as an electrical quantity which is characteristic of the reference pattern, and in addition producing a comparable quantity characteristic of the sample to be compared, and then making comparison of the sample with the pattern by comparing the electrical quantities thus provided.

The scanning herein proposed has the same general purpose as does the scanning done with a television camera for the purpose of transmitting a picture. In either case the purpose of the scanning is to break down a two dimensional picture, in a determined order or sequence, so that the many small bits of information which comprise the picture form an electrical quantity that varies with time. The electrical quantity thus produced is unique for any picture or datum scanned in the particular sequence, this uniqueness being demonstrated in television by the ability of a television receiver to reconstruct the picture or datum from the time varying electrical quantity. The uniqueness of a time varying electrical quantity is utilized to identify the picture or datum by its comparison with many pattern or memory-derived quantities representing possibilities of data with which the unknown datum may correspond, and by "rejection" of those data which do not correspond the identity of the unknown datum may be determined. It will be seen that the scanning may be done with a camera tube or scanner of any suitable type, as for example, the types suitable for or commonly employed in television broadcasting. In order that a series of comparisons may be made, it is desirable that one of the quantities be recorded on some form of memory device so that comparisons may be made with a series of different patterns, or with a series of different samples. The scanner may perform the operation in any desired manner regardless of the direction, continuity or lack of continuity of the lines traversed by the scanning beam, provided that the same system be used for the sample as for the pattern. One common practical use for this device consists in the comparison of a sample with one or many reference patterns already recorded in the memory device, or to compare many samples with a fixed reference pattern.

The invention of my abovementioned copending application will be first illustrated in which one quantity is stored on a magnetic drum memory, or any other form of memory device. In some embodiments of the invention where the sample and pattern are both available, the electrical quantities may be compared directly without a memory device.

However in the embodiments of the present invention the reference pattern is examined to determine certain fixed quantitative values, and thereafter the sample is examined to compare its comparable values with these fixed values. For some purposes, the characteristics of the reference pattern may be reduced to numerical form so that the examination of the sample may then use these fixed numerical quantities as the standard.

We may first refer to the system of my abovementioned copending application as a whole as shown in FIG. 1. As will be later described, the pattern has been scanned to produce a magnetic record on a magnetic drum 16 which, when revolved, gives a quantity at 19*m* characteristic of the pattern. The sample is scanned synchronously with the drum movement to produce a quantity at 19*c* characteristic of the sample. The quantity at 19*m* is amplified at 20*m* and fed to the pulse transformer 23*m* which is grounded at a center tap *mg* on the secondary winding. One output of pulse transformer 23*m* appears on 15*m* and goes to special selector circuit 22.

The quantity 19*c* is amplified at 18*c* before being sent to the differentiating circuit 21, since the quantity at 19*c* is at a relatively low power level, and further, since there is considerable attenuation in the differentiating circuit 21. The quantity 21*c*, having been differentiated and somewhat amplified, is comparable to the quantity 19*m* from the magnetic drum memory. The quantity 21*c* is amplified at 20*c* and fed to a pulse transformer 23*c* which, like 23*m*, is grounded at a center tap *cg* on the secondary winding and feeds a quantity 15*c* to an anticoincidence "or-not-and" circuit 22. What I have called an "or-not-and" circuit is probably better known as an "anti-coincidence" or "exclusive-OR" circuit.

This circuit 22 is specially designed to deliver an electric pulse to an electronic pulse counter 25 whenever a pulse of predetermined polarity is received at either 15*m* or 15*c* without a time coincident pulse of like polarity arriving from the other, but not to send any signal to 25 if pulses arrive simultaneously at both 15*m* and 15*c*. It is for this reason I have designated these circuits 22 as "or-not-and" circuits.

Two of the "or-not-and" circuits 22 and 22*n* are used because each one is responsive to pulses of only one polarity as will be shown later. By providing one such circuit a comparison can be made between the pulses of the two quantities which are of one polarity, but providing the second circuit 22*n*, connected to the lower ends 24*m* and 24*c* of the pulse transformers 23*m* and 23*c* respectively, comparison can be made between the pulses of both polarities in the quantities 19*m* and 21*c*.

The two circuits 22 and 22*n* are both connected to the pulse counter 25. Relay 26 is operated by the counter 25 to reject the sample as different from the pattern if the counter records more pulses than a predetermined desired tolerance; that is if there are more points of difference between the sample and the pattern than are deemed permissible. Theoretically a single pulse at 25 will show a difference between the sample and the pattern, but generally different samples of the same character will show minor variations, and for this reason a permissible tolerance will be adopted.

Figure 2:
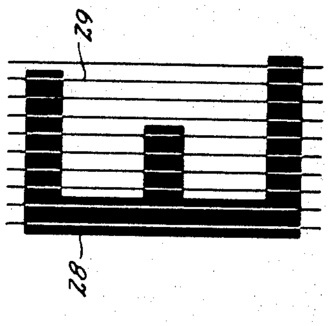
Figure 2A:
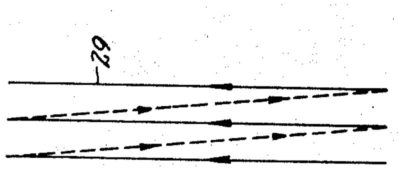
Figure 2B:
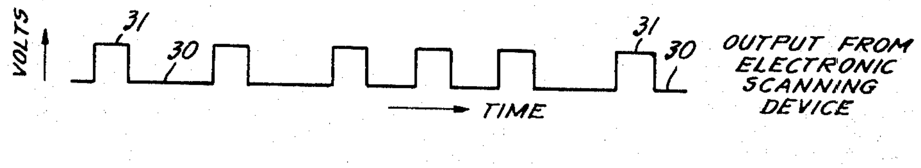

FIGS. 2, 2*a*, and 2*b* show, illustrate diagrammatically the operation of a suitable simple scanning system. In accordance with this scheme, the scanning beam traverses preferably in sequence the pattern 28, in this case the Gothic letter E, in ten parallel scan lines 29 from bottom to top. So long as the beam rests upon the white paper, a static condition exists causing the output to form an electrical quantity of constant voltage as at 30 in FIG. 2*b*. This we may call the base or zero voltage. When, however, the beam passes from the white to the black, a voltage is produced which remains constant until the beam moves back from black to white thus appearing as a pulse 31. With this arrangement, bi-valued electrical quantity is produced which comprises a time series of substantially square pulses 31 in a spaced relation dependent on the contour of the pattern symbol E. The degree to which this quantity is characteristic of the pattern depends upon the proximity of the scan lines to each other, therefore upon the number of scan lines utilized.

If now a similar scanning is performed on a sample to be tested, and if these two quantities are identical within the capacity of the device, it will show that the pattern and the sample are also identical. This comparison can be made for example, by reversing the polarity of one quantity and superimposing it upon the other quantity. Every point where the pulses are of like polarity and simultaneous, the pulses will cancel out; but every point where there is a difference between the quantities, they will not cancel out and an uncancelled impulse will show a difference to exist between the pattern and the sample.

Figure 4:
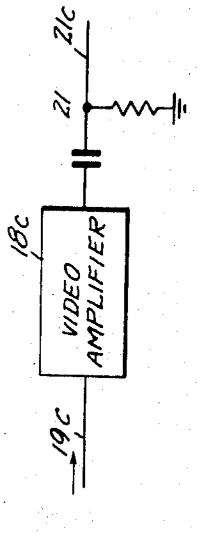
FIG. 4 shows a circuit for differentiating the camera quantity.

More common use of the invention comprises the comparison of a character with a sample or pattern which is already recorded on a memory device, such as a magnetic recorder, or drum. When an electrical quantity, such as shown in FIG. 2*b* is imposed upon a magnetic drum memory, such as is shown, for example, in FIG. 10, the magnetization intensity on the drum varies with drum displacement substantially identically to the bi-valued scanning derived electrical quantity itself as in FIG. 3, at 33 – 34. The identity will be clear, altho the sharp corners of the original pulse 31 of FIG. 2*b* are worn off. When, however, an electrical or readout is made from such a magnetic memory, the quantity produced by the take-off is, as is well known, the differential or time derivative of the recorded magnetization intensity, thus giving a plus pulse 35*m* where the original record pulse begins and a minus pulse 36*m* where the original record pulse 33 ends. These are above and below a base 37*m*. When such a quantity is to be compared, therefore, with a primary quantity scanned direct from a pattern or sample as that shown in FIG. 2*b*, it is necessary that the primary quantity be differentiated also. This can be done by the familiar resistance-capacity circuit designated in FIG. 1 as 21. This is illustrated in FIG. 4 which shows at 19*c* the quantity from the camera which, after being amplified at 18*c*, is connected to one side of a condenser C, the other side of which 21*c* carries the differentiated current being connected to the ground by the resistance R. The output at 21*c* of the circuit of FIG. 4 is a quantity of sharp spikes such as shown in FIG. 5 having plus pulses 35*c* and minus pulses 36*c* from a base 37*c* corresponding to the rise and fall or rate of change of the original undifferentiated pulses.

Figure 3:
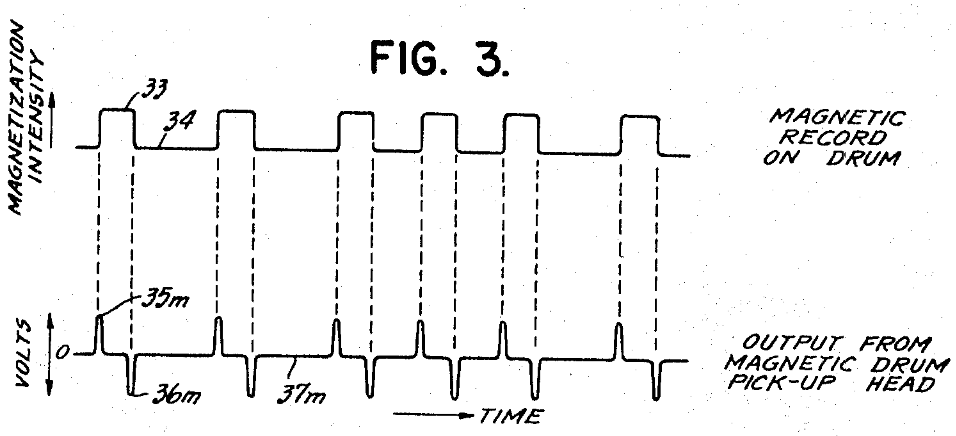
FIG. 3 is a diagram showing the comparison between the scan data as recorded on the memory drum and the output from the pickup heads, in response thereto.
Figure 5:
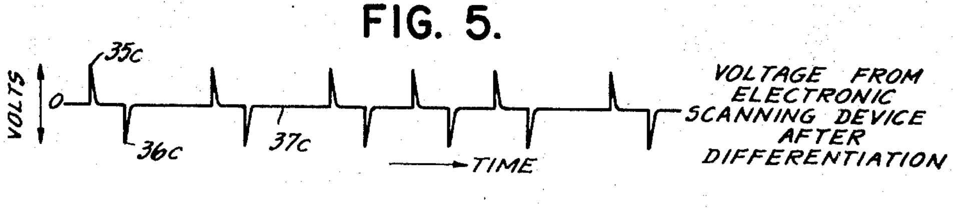
FIG. 5 is a graphic view of the output of the scanning operation, when differentiated to make it comparable with the output of the memory device.

If the pulses 35*m* and 36*m* of the quantity shown in FIG. 3 are coincident in time with the pulses 35*c* and 36*c* of FIG. 5, and if they are superposed with one in reverse polarity, they will completely cancel each other, but if one pulse 35*m* or one pulse 36*m* is not in time with the corresponding pulse 35*c* or 36*c*, the two will not cancel, and a signal will be produced which may be used to point out the lack of identity of the original sample and the original pattern.

Figure 6:
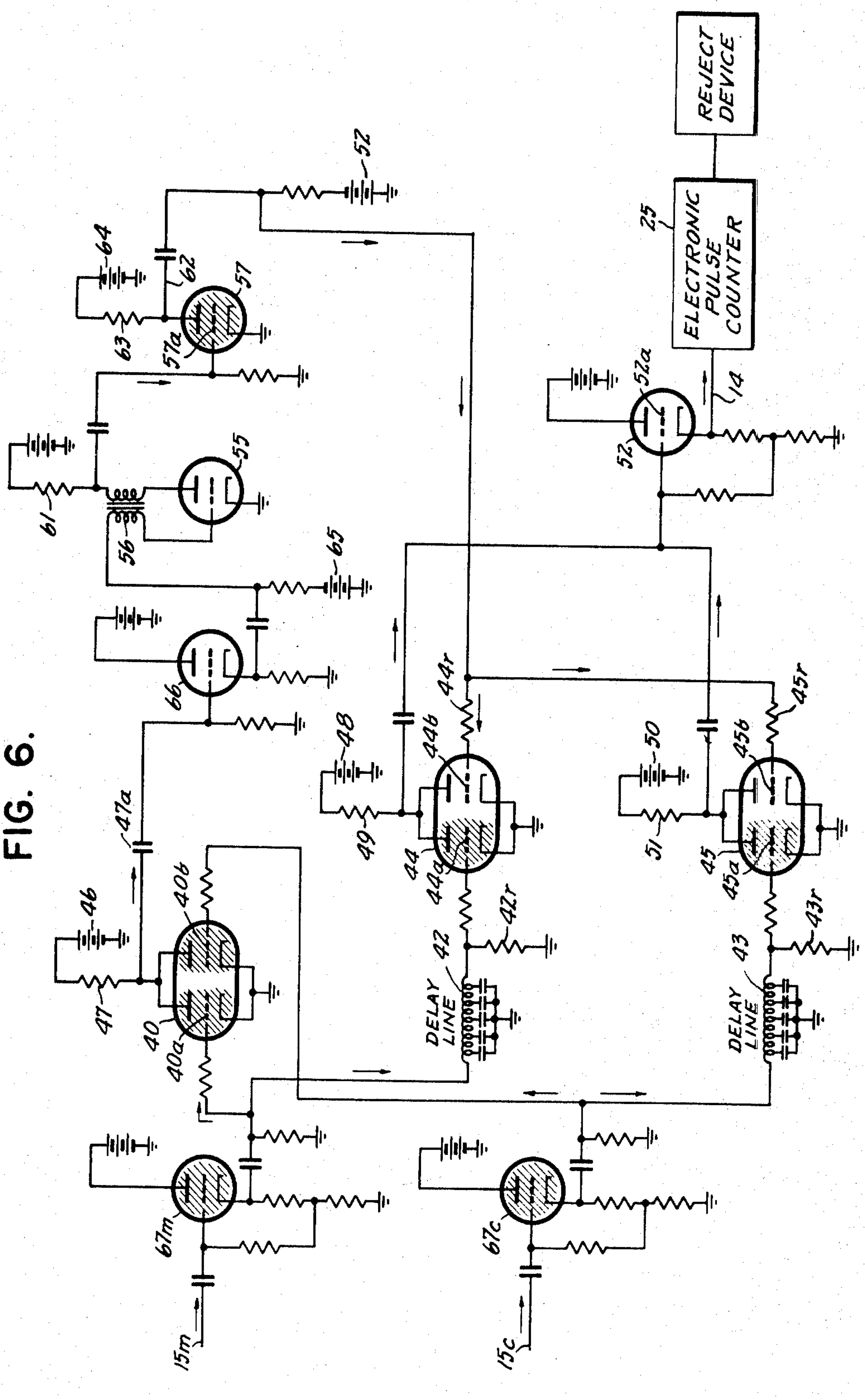
FIG. 6 is a diagram of an "or-not-and" circuit, for comparing the separate quantities.

The anti-coincidence or "or-not-and" circuit which I used for comparing the quantities from the sample with those from the memory device, and which has heretofore been referred to generally as 22 or 22*n*, is the construction shown in FIG. 6. In FIG. 6 the quantity 15*m* derived from the memory device is coupled thru a capacitor to the grid of a cathode follower 67*m*, and the differentiated quantity 15*c* derived from the pattern is fed thru a capacitor to the grid of cathode follower 67*c*. These two cathode followers 67*m* and 67*c* serve to isolate the "or-not-and" circuit from the pulse transformers 23*m* and 23*c* and prevent loading of the pulse transformers. The output of the cathode follower 67*m* is fed to one grid 40*a* of a double triode 40, and the output of the cathode follower 67*c* is fed to the other grid 40*b* of the same tube. Each of these two quantities is also carried thru a delaying circuit 42 or 43 to one grid 44*a* or 45*a* of a double triode 44 or 45 as will be later described.

In accordance with common practice, the tubes which are conducting in the absence of any pulses are shaded. The plates of the tube 40 are connected to a common plate resistor 47 and also thru a condenser 47*a* to the grid of a cathode follower 66 which controls, or "triggers," a blocking oscillator 55. The voltage developed across resistor 61 is connected thru a condenser to the grid 57*a*. Resistor 61 in the plate circuit of oscillator tube 55 provides a negative signal at grid 57*a*, cutting off the current in tube 57 whenever the blocking oscillator is triggered and current flows in tube 55.

The plates of the tube 40 are connected in parallel or multiple and are fed from a battery 46 thru a resistance 47. The plates of the tubes 44 and 45 are, for each tube, connected in multiple, being fed respectively from the batteries 48 and 50 thru resistances 49 and 51. The grids 40*a*, 40*b*, 44*a* and 45*a* are normally maintained at a point to make these tubes conducting in the absence of any pulses at 15*m* or 15*c*, but the other grids 44*b* and 45*b* are biased beyond cut-off by a battery 52 thru resistances 44*r* and 45*r*. A minus pulse at either 15*m* or 15*c* will give a minus pulse at either 44*a* or 45*a*, which will cause a plus pulse at the corresponding plate resistance 49 or 51, which will be fed to the grid 52*a* of a cathode follower tube 52, which in turn feeds a plus pulse out at 14 to an electronic pulse counter 25. A plus pulse at 15*m* or 15*c*, however, will result in plus pulses at grids 40*a*, 40*b*, 44*a* and 45*a* and will have no effect, since the tubes controlled by these four grids are normally conducting at or near saturation. Thus a minus pulse alone at either 15*m* or 15*c* will operate the counter, and the "or" function of the anti-coincidence circuit is achieved.

The tubes 40, 66, 55, and 57 together with their associated circuits perform the "not-and" function in the device. The two halves of the tube 40 form a standard coincidence, or "gate," circuit. A minus pulse at either grid of tube 40 which coincides in time with, or even slightly overlaps a minus pulse at the other grid of tube 40 will cut-off both halves of the tube 40 and cause a plus pulse at the common resistor 47, which pulse will go to the grid of cathode follower trigger tube 66, causing that tube to conduct and trigger or "fire" the blocking oscillator tube 55. When the blocking oscillator fires, the tube 55 draws a large surge of current thru resistance 61, sending a negative pulse to grid 57*a*, which cuts off current in tube 57 and causes a plus pulse at the plate lead 62, which plus pulse is imposed on grids 44*b* and 45*b* of tubes 44 and 45. When the plus pulse at the grids 44*b* and 45*b* causes their respective tubes to be fully conducting, negative pulses at either 44*a* or 45*a* cannot cause pulses to be sent to the counter. Thus it will be seen that coincident pulses at 15*m* and 15*c* cause an inhibiting or blocking output from tube 57 which prevents either or both of the pulses from being counted by pulse counter 25. This blocking can occur, however, only if minus pulses come to both grids of tube 40 at the same time, since the signals at 44*b* and 45*b* which prevent pulses from going to the counter depend upon the current being interrupted in both halves of tube 40 at the same time. Unless the cancelling pulse reaches grids 44*b* and 45*b* at least as soon as the signal pulses reach grids 44*a* and 45*a* cancellation would not occur; and the cancelling pulse cannot come unless both of the input pulses have reached tube 40. If one of these pulses was slightly delayed until after the other pulse had registered, a false count would result. The purpose of the blocking oscillator 55 and the delay lines 42 and 43 is to avoid this difficulty. The blocking oscillator produces a pulse which has a longer duration than the input pulse. This is achieved by suitable proportioning of the components of the blocking oscillator, according to standard principles. The delay lines, on the other hand, cause a sufficient delay in the pulse to tubes 44 and 45 so that the signal pulse at 44*a* or 45*a* is substantially centered with respect to the blocking pulse upon the grids 44*b* or 45*b*. With this construction the signal pulses can be slightly different or misaligned in time of their arrival, and still achieve the mutual cancellation which gives the circuit its "not-and" characteristic.

The blocking oscillator 55 need not here be described in detail since, like the delay line, such circuits are described in standard literature, for example on page 205 of WAVEFORMS, by Chance, Hughes, MacNichol, Sayre, and Williams, Volume 19 in the Radiation Laboratory Series published by McGraw-Hill Book Company, New York.

It will be noted from FIG. 6 that the grid circuit of the oscillator 55 is biased to cut-off by a fixed negative voltage from battery 65 so that the tube 55 will remain non-conducting until a pulse is applied to it large enough to drive the grid well up towards zero voltage relative to the cathode.

The circuit of FIG. 6 is responsive only to minus pulses, a plus pulse having no effect since input tubes 67*m* and 67*c* are normally conducting at or near saturation, and plus pulses would not change the state of either tube. It will be understood that a pulse of one polarity at 19*m* of FIG. 1 can be made to cause a pulse of either the same or opposite polarity at 15*m* depending on the direction of the windings of the pulse transformer 23*m* and the number of polarity reversals in the amplifier 20*m*. If the circuit is constructed, however, so that a plus pulse at 19*m* causes a plus pulse at 15*m*, then this same plus pulse at 19*m* will also cause a minus pulse at 24*m*. A pulse of either polarity at 19*m* will cause simultaneous pulses at 15*m* and 24*m* and these latter two pulses will always be of opposite polarity with respect to each other. Thus the minus pulses at 15*m* and 15*c* may correspond to a point on the pattern or sample where the scanning beam goes from white to black or vice versa.

The device may be operated with pulses of only one polarity and be unresponsive to pulses of the other polarity, since generally there will be the same number of plus pulses as negative. Greater reliability and accuracy will be obtained, however, if both plus and minus pulses are considered since in this manner a comparison will be made between the sample and the pattern where the scanning beam passes from a white area to a dark area and also where the beam passes from a dark area to a white area. For this reason I prefer to use two circuits such as FIG. 6, one at 22 and the other at 22*n*, connected to the pulse transformer 23*m* so that a pulse of either polarity at 19*m* will cause a negative pulse at either 22 or 22*n*.

Figure 7:
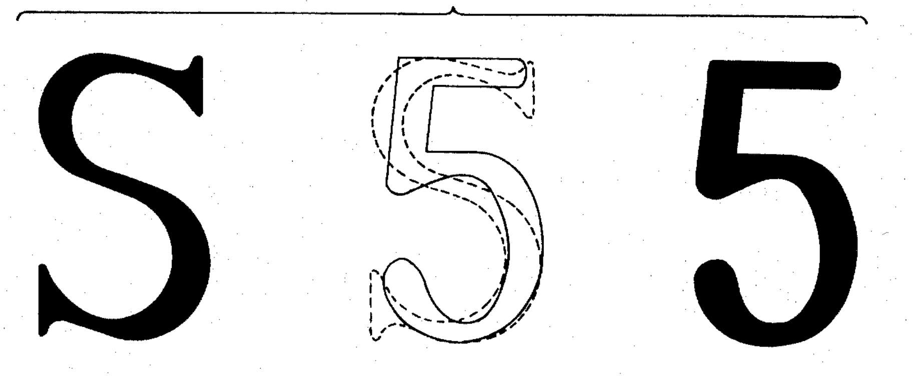
FIG. 7 is a comparison of similar but not identical figures.

As a graphic illustration of the operation of this form of device and its ability to distinguish between two characters which are very similar, there is shown in FIG. 7 a letter S and the numeral 5 to be compared with each other. The system of my invention makes separate scanning of these two characters. In this figure, however, I have superposed them in order to make a visual comparison possible. We may now consider two electron beams simultaneously but separately scanning these two figures, arranged to balance out the identities as we have described. Whenever the one beam encounters the edge of the 5 at the same time that the other beam encounters the corresponding edge of the S, the signals cancel out.

If now we place lines upon this figure to represent the path of the scanning beams, we will see that for every place where these scanning lines meet one of these figures but not the other, a pulse will result which will not be cancelled by a like pulse from the other and a pulse will be recorded on the pulse counter. In spite of the general similarity of the figures, it will be seen that there are a large number of places where one scanning beam would meet or leave an edge of its figure before the other scanning beam would meet or leave its figure. Each such instance would feed a pulse to the pulse counter.

Figure 8:
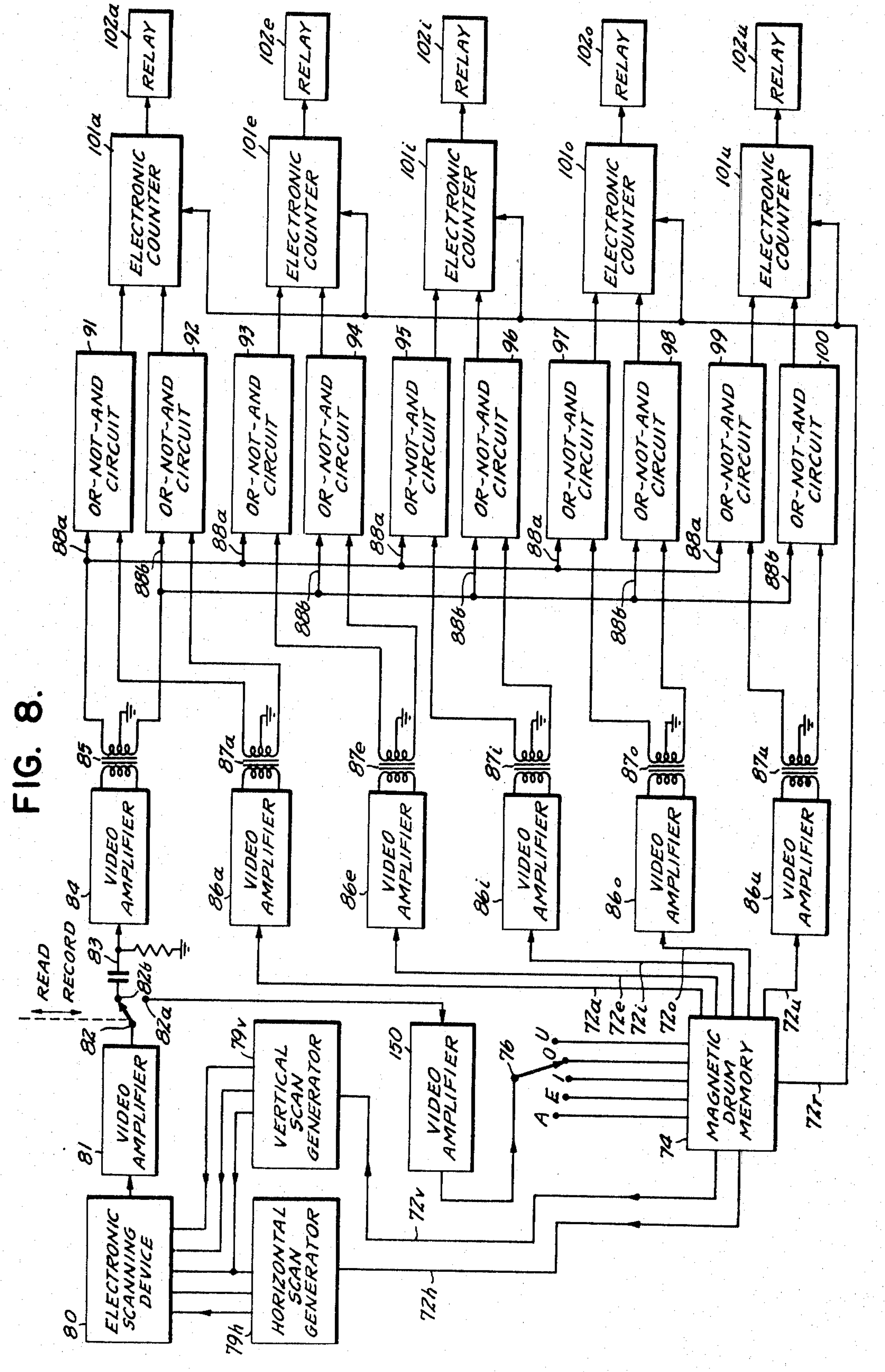
FIG. 8 shows a system for comparing a sample with five separate pattern records in a memory device.

In these embodiments which embody a magnetic drum, or equivalent memory device, the scanning beam must be kept in accurate synchronism with the rotation of the magnetic drum, and the electronic counter must be reset at the close of each comparison. There are thus provided upon the magnetic drum, two or three channels, as will be described later, two of which may be used to control the scan generators, and one of which is used to reset the counters and relays. In FIG. 8 there is shown an arrangement for comparing a specimen simultaneously with five different patterns. For example, we may use this arrangement to determine the identity of the sample with any of the five vowels, A, E, I, O, or U. In FIG. 9 there is shown a conventional simple scanning device for such a system, and in FIG. 10 the connections to the memory device.

As will be seen from FIG. 10, the memory device 74 has five recording heads 75*a*, 75*e*, 75*i*, 75*o*, and 75*u*, each recording on one channel of the memory device, and each connected to the video scanner circuit by a point A, E, I, O, U on a switch 76. By first scanning a vowel A with the switch connected to the head 75*a*, the proper sequence of pulses relating to the letter A will be imposed on the first channel. Similarly a proper pulse sequence for each of the other vowels may be imposed each on its proper channel.

The memory device has also five reading heads each controlled by one of the channels, here marked 77*a*, 77*e*, 77*i*, 77*o*, and 77*u*, each of which is used to make the comparison of the sample with its own letter. The memory device has also two heads 77*v* and 77*h* for controlling the scanning generators. There is also an eighth head 77*r* to reset the counter elements and relays.

The scanning device of FIG. 9 is a conventional scanning element having the vertical control plates 78*v* operated by the vertical generator 79*v* controlled by the drum head 77*v*, and the horizontal control plates 78*h* operated by the horizontal generator 79*h* controlled by the drum head 77*h*. This is a relatively inexpensive type of television camera utilizing reflected light. The spot of light on the face of the cathode ray tube 68 is focussed by lens 69 on the sample, which is shown in FIG. 9 as a symbol "E" on a background of contrasting energy-reflective property. Reflected light is detected by photo-tube 70, the relative amount of reflected light being dependent on whether the spot of light focussed on the sample falls on a light or dark portion of the sample.

The scanning signal is carried from the scanner 80 (see FIG. 8) thru amplifier 81 to a switch 82 having two positions, one of which 82*a* leads to amplifier 150 and from there to switch 76 for selectively connecting the scan signal to one of the recording heads at 75*a*, 75*e*, etc. The other position 82*b* of switch 82 connects that signal thru a differentiating circuit 83 to an amplifier 84 and thence to a pulse transformer 85 having its secondary grounded in the middle.

The terminals 72*a* to 72*u* are also connected thru amplifiers 86*a* to 86*u* to transformers 87*a* to 87*u* each of which also has its secondary grounded in the middle, as has been above described for transformer 85. These center-tapped pulse transformers provide a means for obtaining from each circuit two signals of opposite polarity, so that both the positive and negative pulses from the sample or pattern may be counted as was described in the circuit of FIG. 1.

The upper output terminal of transformer 85 is connected to an input terminal 88*a* of each of five "or-not-and" circuits 91, 93, 95, 97, and 99. The lower output terminal is likewise connected to the 88*b* input of each of five other such circuits, 92, 94, 96, 98, and 100. Thus either a plus or minus pulse from the scanning circuit will produce a minus pulse on each member of one or the other of these two sets of "or-not-and" circuit.

The upper terminal of the transformers 87, on the other hand, is connected, each to one only of these "or-not-and" circuits, that is the upper terminal of transformer 87*a* is connected to circuit 91, or 87*e* to circuit 93, of 87*i* to circuit 95 etc., while the lower terminal of each of these transformers is connected to one circuit only for each, the lower terminal of transformer 87*a* being connected to 92, that of 87*e* being connected to 94, etc. Thus, plus pulses from the memory will enter one circuit, as 91, as negative pulses, and negative pulses from the memory will enter the other, as 92, as negative pulses. Each of the circuits 91, 92, is of the type shown in FIG. 6 and the pulses from the upper terminal of transformers 87 correspond to the pulses 15*m* of FIG. 1 while the pulses from the lower terminal of transformers 87 correspond to the pulses 24*m* of FIG. 1. Since pulses of opposite polarity always occur simultaneously at the two ends of the secondary winding of transformer 87, there will be a plus pulse sent to 92 for each minus pulse sent to 91 and vice versa, but the circuits 91, 92, 93, etc. are unresponsive to the plus pulses, as was shown in FIG. 6.

The two "or-not-and" or anti-coincidence circuits associated with each channel, such as circuits 91 and 92 are of the "A" channel, jointly operated counters 101*a*, 101*e*, 101*i*, 101*o*, etc., and if the count of unmatched pulses is too great, a counter operates its relay 102 to reject the sample as different from its own pattern. Every counter will reject the specimen as having too many points of difference from its own pattern except the one which represents the same character, but that particular counter will indicate identity by counting no pulses or only a very few.

Let us now present the letter "E" to the machine for identification. The pulse data from the scanner, after being differentiated at 83 is fed to the pulse transformer 85 and thus fed to "or-not-and" circuits 91, 92, etc., it being noted that one side of the pulse transformer is connected to one "or-not-and" circuit and the other side is connected to the other "or-not-and" circuit of each channel. In synchronism with the scanning, each reading pick-up head feeds pulse data, corresponding to its own character, to the two or-not-and circuits of its channel. The pulse trains from the scanning and from the memory from channel E will be coincident in time spacings and will cancel each other at or-not-and circuits, and the E counter will not reject. The counters of all the other channels however, will show many differences, and the specimen will be rejected as differing from the symbol stored in every channel except the E channel. Thus it will be seen that by the process of elimination the specimen is identified as an E. If a G were presented it would be rejected by every channel, since the pulse data for a G is not stored in any channel.

The description thus far has been directed to an embodiment in accordance with the invention of my above-mentioned copending application and has been presented by way of background material to aid in the understanding of an embodiment of the instant invention, now to be described, which uses many of the same components and sub-assemblies. The embodiment in accordance with the instant invention does not require a memory device of the nature utilized with the preferred embodiment and the measurement of the time coincidence of electrical impulses, or lack thereof, is not necessary. If, following the generally accepted definition used in television engineering, a "field" is considered to consist of a plurality of scanning "lines" which together cover the area of the picture or datum being scanned, then this alternate form of the device employs a plurality of fields with the direction of the lines in each field at an angle with respect to the lines of the previous field. During each field, as the symbol to be identified is scanned, the pulses from the scanning device are counted by an electronic counter. Each and every letter scanned will produce a definite number of pulses during each field. Inasmuch as the interception of a portion of the item scanned will cause a pulse to be registered no matter where the portion occurs along the scan line, and inasmuch as sensing a given portion of the item scanned produces a pulse irrespective of which particular scan line of the field crosses it, it will be apparent that the pulse count registered in the counter during a given field will be substantially invariant with or independent of the translational location in two dimensions, or any direction, of the item being scanned within the field being scanned. For a particular field there may be more than one letter having the same count, but there will be no two letters which have the same count for every one of a plurality of fields. If a relay unit containing a rejection device is provided for each letter or numeral to be identified, and after each and every field the rejection device operates to reject the letter or numeral as not being its own if the number of pulses counted during the preceeding field do not correspond to the number for its letter or numeral, then, when the several fields in different directions have been completed, all of the rejection devices, except the one corresponding to the letter or numeral scanned, will have operated and rejected the letter or numeral scanned.

While either the scanning device or the datum being scanned might be rotated a discrete amount between fields, it is more convenient to permit a continuous rotation of the direction of the scan lines relative to the datum thus obtaining an increased operating speed without loss of accuracy. FIG. 15 illustrates the sequence of events which occur during the process of identification of a graphic datum.

An apparatus employing the method of multiple scanning is shown in FIG. 11. The use of three relay units 128 makes possible the identification of three letters or numerals such as the letters, A, B, and C for example. In general there must be one relay unit for each letter or numeral to be identified. The relays in the three relay units, 128*a*, 128*b* and 128*c*, operate to reject the datum presented for identification as not "A", not "B", or not "C" respectively if the number of pulses counted during any field is not the correct number for an A, B, or C respectively.

The horizontal and vertical scan generators, 140 and 141 perform the same functions generally as in the preferred form illustrated in FIG. 8. More specifically in this case, however, since the direction of the scan lines changes relative to the datum being scanned from one field to the next, the vertical scan generator 141 generates each scan line while the horizontal scan generator 140 causes the movement of the scan beam in a direction generally perpendicular to the direction of the scan lines.

The operation of the device shown in FIG. 11 can best be understood by examination of the various elements. The electronic counter 124, is shown in detail in FIG. 12. The other counters, 125 thru 127, are identical to counter 124. This is a binary counter since it can assume only two different stable states. There must, of course, be enough of these binary counters connected together to permit counting, in binary arithmetic, the largest number of pulses which will occur in any field, and the maximum count which a group of counter units connected in series is capable of counting is $(2^n-1)$ where $n$ is the number of binary counter units such as the one shown in FIG. 12. The number of pulses per field, in turn, is dependent on the number of lines per field and on the datum to be scanned.

The dual triode 170 in FIG. 12 together with its associated circuits is basically a binary counting unit. The plate lead 177 of the left hand half of dual triode 170 is connected thru resistance 270 to grid 170*b*, while the plate lead 178 is connected thru resistance 271 to grid 170*a*. By thus connecting each plate thru a suitable resistance to the grid of the other triode, a bistable device is created. If the left hand side of the dual triode is fully conducting it causes grid 170*b* to have a considerable negative voltage with respect to its cathode, so that the flow of current in the right hand half of the tube is substantially cut-off. As the current in the right hand half of the tube is cut off, the voltage at its plate lead 178 rises sufficiently to cause grid 170*a* to be positive with respect to its cathode, and the left hand half of the dual triode continues to be fully conducting. In the condition where the left hand side of the tube is fully conducting and the right side is substantially cut-off, the circuit is stable and this condition will continue indefinitely until upset by outside influences. On the other hand, if the grid 170*a* is momentarily made sufficiently negative with respect to its cathode to cut off the left hand side of the tube, the voltage at plate lead 177 will rise causing grid 170*b* to become less negative. The right hand side of the dual triode 170 starts to conduct and in so doing the voltage at its plate lead 178 decreases. This decrease in voltage is transmitted to grid 170*a* by resistor 271 and causes grid 170*a* to become more negative and further cuts off the left hand side of the dual triode 170. This process continues until the right hand half of the tube is fully conducting and the left hand side is substantially cut-off, this being the second stable state which the circuit can assume. The capacitors 272 and 273 speed up the transition from one stable state to the other by providing a relatively low impedance path for transient voltages from one plate to the opposite grid.

When a "flip-flop" or bistable device such as dual triode 170 is used as a binary counter, one of the stable states is designated the "0" condition and the other stable state is designated as the "1" condition. The dual triode 170 will be considered to be in the "0" condition when the left hand side is fully conducting and the right hand side is substantially cut-off, and will be considered to be in the "1" condition when the left hand side is substantially cut-off and the right hand side is fully conducting. As the dual triode switches from the "1" to the "0" condition, the voltage on lead 176 becomes less negative or more positive and a plus pulse is sent to the next counter 125.

Plate power to operate the dual triode 170 is provided by batteries 181 and 274. The battery 181 is of such voltage that the voltage on the out-put lead 130 is essentially zero when the left hand side of the tube is cut-off and the voltage on output lead 131 is essentially zero when the right hand side of the tube is cut-off. The voltage at leads 130 and 131 is substantially negative when the left hand or right hand side respectively of the dual triode 170 is fully conducting. Thus the voltage on leads 130 and 131 can be used to indicate which of the two stable states the dual triode is in at any time.

The dual triode 171, with one plate lead connected to 177 and the other to 178, is used to cause the dual triode 170 to flop from one stable state to the other. In the absence of any pulses on lead 175, the battery 173 causes both halves of dual triode 171 to be fully cut-off. If, however, a positive pulse appears on lead 175, it causes both halves of dual triode 171 to become conducting, which in turn causes a drop in voltage at both 177 and 178. If the dual triode 170 was originally in the "0" condition the negative pulse at 177 and 178 would have no effect on the right hand side of the tube since this half of the tube is already cut-off. The negative pulses at 177 and 178, however, will cause the left hand side of the tube to be cut-off. As the left hand side cuts off, the voltage at lead 177 starts to rise and this rise in voltage is transmitted to grid **170*b* by resistor 270 and capacitor 272 and the right hand side of the tube starts to conduct. As the right hand side starts to conduct the voltage at lead 178 goes more negative, further cutting off the left hand side of the tube because of the resultant decreasing voltage at grid 170*a*. This action continues until the right hand side of the tube is fully conducting and the left hand side is cut-off and the dual triode 170 has assumed the "1" condition. When another plus pulse occurs at lead 175, the current in tube 170 will be transferred from the right hand half back to the left hand half. Thus for each plus pulse on 175, the dual triode 170 changes from one stable state to the other. Minus pulses on lead 175, on the other hand, cause no change, since dual triode 171 is statically biased beyond cut-off by battery 173**.

The triode 172 is used to reset the counter tube 170 by forcing tube 170 to assume the stable state corresponding to a "0". Tube 172 is statically biased beyond cut-off by battery 174. A minus pulse on lead 123 has no effect, but a plus pulse on lead 123 causes triode 172 to become conducting, which causes a transient negative voltage at lead 177. If the dual triode 170 is already in the "0" state and the right hand side is cut-off, the transient negative voltage at 177 and the resultant negative pulse at grid **170*b* have no effect. If, however, the dual triode 170 is in the "1" condition and the right hand side is fully conducting, the negative pulse at 177 when triode 172 becomes conducting causes grid 170*b* to cut-off, the left hand side of dual triode 170 becomes fully conducting, and the counter is in the "0" condition. Counters of this type are well known being described, for example, in the standard text, HIGH SPEED COMPUTING DEVICES by Engineering Research Associates, published by McGraw-Hill. Reference may be had particularly to section 3–5, page 17** thereof. As will be seen below, the parallel multi-bit digital signal registered in the counter at the completion of each field is applied to recognition circuit means which is coded in accordance with characteristics of a plurality of known letters or symbols or the like.

The relay units 128 are shown in detail in FIG. 13. The dual triode 150 operates in an identical fashion to the dual triode 170 of FIG. 12. In the dual triode 150, as with dual triode 170, each plate is connected thru a resistance and capacitance to the opposite grid thereby forming an electronic circuit which can assume, and maintain indefinitely, either of two stable states; either the left hand side of the tube is fully conducting and the right hand side is substantially cut-off or the left hand side is substantially cut-off and the right hand side is fully conducting. The battery 160 is of such voltage that the voltage on lead 159 is substantially negative when the left hand side of the dual triode 150 is fully conducting which corresponds to the "0" condition in the nomenclature established for the dual triode 170 of FIG. 12. When current in the left hand side of the dual triode 150 is essentially cut-off, the voltage on lead 159 is zero, and dual triode 150 is in the "1" condition.

The lead 159 is connected to the grid of triode 151, this triode being energized by battery 281 and containing relay 152 in its plate circuit. When current flows in tube 151 the relay 152 is energized, but when current is cut-off in tube 151 relay 152 is de-energized. The flow of current in tube 151 is determined by the voltage of its grid relative to its cathode, the latter being grounded. If the grid of tube 151 is substantially negative, the current in the tube is cut-off, but if the grid is at zero volts or slightly positive with respect to its cathode the tube is fully conducting. Since the grid of tube 151 is tied to the plate of the left hand side of dual triode 150 by lead 159, the triode 151 is cut-off and relay 152 is de-energized when the left hand side of dual triode 150 is fully conducting which corresponds to the "0" condition for dual triode 150. On the other hand, tube 151 is fully conducting and relay 152 is energized when the left hand side of dual triode 150 is cut-off which corresponds to the "1" condition for dual triode 150.

The dual triode 153 is used to set and re-set the dual triode 150 and thereby energize and de-energize the relay 152. The triode 154 is a simple resistance-capacitance coupled voltage amplifier having a resistance in its plate circuit and being energized by battery 280. When a minus pulse occurs on lead **129*a* the pulse is amplified by tube 154 and sent to grid 153*a* as a plus pulse. The grid 153*a* is statically biased beyond cut-off by battery 157 so that this half of dual triode 153 is normally non-conducting. When a plus pulse is received on grid 153*a*, however, the left hand side of triode 153 becomes conducting, which causes a minus pulse to appear at the right hand plate lead 282 of dual triode 150 and also at grid 150*a*. If the left hand side of dual triode 150 was already cut-off this minus pulse has no effect, but if the left hand side of dual triode 150 has been conducting, the minus pulse on grid 150*a* causes it to be cut-off and the right hand side of dual triode 150 becomes fully conducting. With the left hand side of dual triode 150 cut-off, the triode 151 conducts and relay 152 operates. Additional plus pulses on grid 153*a* then have no further effect. Plus pulses on 129*a* cause minus pulses to occur at grid 153*a* but these have no effect since grid 153*a* is normally biased to cut-off by battery 157. It may then be said that a minus pulse on 129*a* causes the dual triode 150 to be "set", or placed in the "1" condition, which results in the relay 152** being "-set", or energized.

The relay 152, once having been "set", or energized, by a minus pulse on **129*a*, remains energized until the dual triode 150 is "reset" to the "0" condition in which the left hand side of dual triode 150 is fully conducting. The right hand side of dual triode 153 is used to reset the counter tube 150 and de-energize the relay 152. The grid 153*b*** is normally biased to cut-off by battery 158. When a plus pulse appears on lead 145, the voltage on grid 153*b* goes in the positive direction and the right hand side of dual triode 153 becomes conducting, which in turn causes a negative pulse to occur on grid 150*b*. The minus pulse on grid 150*b* causes the right hand side of dual triode 150 to be cut-off while the left hand side of dual triode 150 becomes fully conducting. When this occurs the dual triode is in the "0" state and may be said to have been "reset", and the relay 152 is de-energized. If the dual triode 150 had been in the "0" state when the plus pulse occurred at grid 153*b*, the dual triode 150 would have remained in the "0" condition and the relay 152 would have remained deenergized. When the relay 152 is energized it operates a rejection device, indicating that the letter just scanned was not the one corresponding to the letter or symbol assigned to that particular relay unit.

The operation of the synchronizer unit 121 can best be understood by reference to FIG. 14, which is an electrical-mechanical schematic diagram of the synchronizer unit. In FIG. 14 solid lines are used to denote electrical connections and dotted lines to denote mechanical connections. The electric motor 256 drives shaft 192, which is coupled thru gear reduction 196 to shaft 193, which is in turn coupled to shaft 194 by gear reduction 197. The shaft 192 turns one revolution per scan line in the scanning device 120, the shaft 193 turns one revolution per scan field, and the shaft 194 turns one revolution for the group of scan fields which are used to identify each letter or symbol.

The pulses to synchronize the vertical scan generator are sent out on lead 143, the pulses to synchronize the horizontal scan generator are sent out on lead 142, pulses to reset the counters 124 thru 127 after each field are sent out on lead 123, and pulses to reset the relay units 128 after each series of fields are sent out on lead 145. The four pulse generating units 285 thru 288 all operate the same way so only pulse generating unit 285 will be described in detail. The wheel 250 in FIGS. 14 and 14*a* is driven by shaft 192*a* and turns at the same speed as shaft 192. On the rim of wheel 250 there is attached a small permanent magnet 254 (FIG. 14*a*). A coil 255 is placed so that the flux from permanent magnet 254 passes thru coil 255 once during each revolution of wheel 250. One end of coil 255 is grounded. The other end of coil 255 is attached to lead 143 so that a voltage of one polarity appears on lead 143 as flux from magnet 254 enters the coil, and a voltage of opposite polarity appears on lead 143 when flux from the magnet leaves coil 255. Thus as the permanent magnet rotates there is on lead 143 a short plus pulse and a short minus pulse, one after the other, as magnet 254 passes by the coil 255 (FIGS. 14 and 14*a*). As previously stated, these pulses on 143 are used to synchronize the vertical scan generator 141. The pulse generators 286 thru 288 operate in a manner identical to pulse generator 285, there being a plus and a minus pulse on leads 142 and 123 for each revolution of shaft 193, while a plus and a minus pulse appear on lead 145 for each revolution of shaft 194.

As previously mentioned, a continuous rotation of the direction of the scan lines with respect to the datum being scanned is provided. This rotation may be accomplished in any suitable manner, as by using a magnetic deflection yoke 257 placed about the neck of the scanner tube 258. The datum being scanned is held stationary, but the magnetic deflection yoke 257 is rotated, producing a continuous rotation of the scan lines relative to the datum being scanned. The magnetic deflection yoke 257 is mechanically connected to the shaft 194 and rotates one revolution for each revolution of shaft 194. Thus the direction of the scan lines rotates thru a full 360° during the process of identifying each letter or symbol. During each scan field, or for each revolution of shaft 193, the number of pulses resulting from scanning the datum to be identified are counted by counter units 124 thru 127. At the end of each field the outputs 130 thru 137 of the counter units are connected to leads 210 thru 217, respectively, by the counter output contacts 200 thru 207. The counter output contacts 200 thru 207 are driven by shaft 193*c*, rotate at the same speed as shaft 193, and make contact between leads 130 and 210, between 131 and 211, etc., for one short interval during each revolution, this contact being arranged to occur at the completion of each field.

The counter output multiple switching units 220 thru 227 are used to selectively connect the outputs of the counter units 124 thru 127 to the relay units 128 when the counter output contacts 200 thru 207 are closed. Multiple switching units 220*a* thru 227*a* are driven by shaft 194*a* and turn one revolution per revolution of shaft 194; multiple switching units 220*b* thru 227*b* are likewise driven by shaft 194*b* and multiple switching units 220*c* thru 227*c* are driven by shaft 194*c*. Thus each of the multiple switching units turns one revolution per revolution of the deflection yoke 257, which also corresponds to one revolution of the scan lines relative to the datum being scanned. There is one pair of multiple switching units, such as 220*a* and 221*a*, to connect a particular counter unit such as 124 with a particular relay unit, such as 128*a*. In each pair of counter output multiple switching units such as 220*a* and 221*a* there are a total of five contacts, so five scan fields are used to identify each letter or symbol. If the number of fields is increased the total number of contacts on each pair of multiple switching units such as 220*a* and 221*a* must be likewise increased. It will be noted that the contacts on any pair of multiple switching units, such as 220*a* and 221*a*, or 224*b* and 225*b*, are never made on both units of the pair at the same time. When contacts on one multiple switching unit in a pair are closed the contacts on the other switching unit in the pair are always open. This is done since after a particular field and for a particular letter or symbol scanned, each counter unit 124 thru 127 should be in a definite state, either the "0" or the "1" condition, if the symbol scanned was the one corresponding to the relay unit to which a particular set of multiple switching units are connected.

The outputs of the multiple switching units 220*a* thru 227*a* are connected together thru adding resistors 240*a* thru 247*a* and a voltage proportional to the sum of these outputs appears on lead 129*a* and is sent to relay unit 128*a*. Likewise the outputs of multiple switching units 220*b* thru 227*b* are connected together by adding resistors 240*b* thru 247*b* and sent by lead 129*b* to relay unit 128*b*. The outputs of multiple switching units 220*c* thru 227*c* are handled in a similar fashion and sent to relay unit 128*c*. The creation of the minus voltage which may appear on lead 129*a* may be better understood by consideration of a specific example. Assume that a field has just been completed scanning the letter "A", and assume that the counter output contacts 200 thru 207 have just closed as shown in FIG. 14 and that the counter output multiple switching units 220*a* thru 227*a* are in the position shown in FIG. 14. If counter 124 is in the "1" condition there will be zero voltage on lead 210; if counter 125 is in the "0" condition there will be zero volts on lead 213; if counter 126 is in the "0" condition there will be zero volts on lead 215; and if counter 127 is in the "1" condition there will be zero volts on lead 216. This number in the counter units 124 thru 127 is 1001 in binary arithmetic, or 9 in decimal notation. In general the binary number represented by the zero's and/or one's in the counter units is determined by writing down, from left to right, the numbers in counters 127, 126, 125 and 124 in that order. The last counter 127 in the series of counter units corresponds to the highest order binary digit in the binary number. When counter output multiple switching units 220*a*, 223*a*, 225*a* and 226*a* are making contact as shown in FIG. 14, then the zero voltage on leads 210, 213, 215 and 216 as counter output contacts 200 thru 207 close will add up, thru resistors 240*a*, 243*a*, 245*a* and 246*a* to give zero volts on lead 129*a*. If, however, one or more counter units 124 thru 127 were not each in the condition assumed above, then there would be a minus pulse on one or more of the leads 210, 213, 215 and/or 216 when the counter output contacts 200 thru 207 closed, with a resultant minus pulse on lead 129*a*. It will be seen that the magnitude of the minus pulse will be dependent upon which of the leads carries a minus pulse, with the leads corresponding to higher order binary digits providing greater minus pulses through their scaling resistors. Hence minus pulses on the least significant digit leads will cause minus pulses of lesser magnitude on conductors 129. A minus pulse of sufficient magnitude on 129*a* would cause relay unit 128*a* to operate. While the embodiment of FIGS. 1 and 8 serially applies pulses to its comparing means as scanning proceeds, it will be seen that the embodiment of FIGS. 11–14 derives electrical quantities in parallel digital form, and that the parallel quantities are applied simultaneously at the end of a scanning field to be compared with the parallel number built into the synchronizer. The stored number is subtracted from the number presented to the synchronizer, and upon exceeding a desired tolerance, the difference signal operates to reject. The cascaded counter stages 124–127 will be seen to comprise an accumulator means which is operative while a field is scanned to receive a waveform comprising a series of signals resulting from the scanning, and operative after the field is completed to provide a pattern of output signals which are collectively characteristic of the symbol or character scanned. Since the signals temporarily stored in the counter are received serially over a period of time and the output signals from the counter are applied together or in parallel, the system will be seen to comprise serial-to-parallel conversion means.

Let us now assume that the multiple switching units 220*a* thru 227*a* have been properly arranged so relay unit 128*a* will identify the letter "A", units 220*b* thru 227*b* and relay unit 128*b* will identify the letter "B"; and units 220*c* thru 227*c* and relay unit 128*c* will identify the letter "C". If the letter "A" is now presented for identification and scanned by the several fields it will be found that the voltage on lead 129*a* remains zero when the counter output contacts 200 thru 207 close at the end of each field because the counter units will in every field have counted the number of pulses corresponding to the letter "A". Thus no minus pulses will be sent to relay unit 128*a* and the relay 152 in relay unit 128*a* will not operate to reject the letter scanned and having failed to reject will thereby indicate that the letter scanned was an "A". As the counter output contacts 200 thru 207 close after each field, however, a minus voltage will appear once or more on leads 129*b* and 129*c*, causing the relays in relay units 128*b* and 128*c* to operate and reject the letter scanned as not "B" and not "C". The minus voltage appears once or more on 129*b* and 129*c* because the number of pulses counted in each and every field will not be the correct number for the letters "B" and "C" respectively. After the series of fields have been completed, the plus pulse on lead 145 from pulse generator 288 resets all the relay units 128 so they are ready to identify the next letter of symbol presented to the device. If, however, the letter "E" had been presented for identification, the relays in all of the relay units 128 would operate to indicate that the letter scanned was not "A", not "B", and not "C". Thus it will be seen that this embodiment in accordance with the present invention scans the unknown symbol in a plurality of different directions to derive electrical quantities in the form of pulse-counts, which are coded as digital (binary in the example) numbers on conductors 130–137. These quantities are compared in accordance with their number (rather than in accordance with their time-spacing as in the preferred embodiment) with stored number quantities represented by the circuit connections of the pattern apparatus shown in FIG. 14. If the coded number represented on the conductors 130–137 does not agree with the stored number built into a particular switching circuit of the pattern, that switching circuit operates to reject the unknown symbol as different than the symbol represented by the stored number associated with the switching circuit. Since the signal which appears on a given line 129 after a field is scanned has an amplitude which varies as a function of the degree of match between the symbol scanned and a given one of the set of symbols the machine is intended to recognize, the line 129 signal will be seen to vary in accordance with a conditional probability that the symbol scanned is a particular symbol of the set, and since whether or not each relay unit 129 is triggered depends upon the amplitudes of all the successive signals occurring in its associated line 129 as the plural fields are successively scanned, it will be apparent that identification depends upon a composite, as distinguished from conditional, probability or likelihood. It is convenient to refer to the set of symbols which a machine is intended to recognize as the "machine vocabulary".

If it is necessary or desirable to have no mechanical connection between shaft 194 and the scanner tube 258 as shown in FIG. 14, an arrangement such as is shown in FIG. 14*b* can be used. In FIG. 14*b* the scanner tube 302 has electrostatic deflection plates which include vertical deflection plates 301*v* and horizontal deflection plates **301*h*. The outputs of the horizontal scan generator 140 and the vertical scan generator 141 are connected thru the magnetic resolver 303 to the horizontal and vertical deflection plates 301*h* and 301*v*** respectively.

A magnetic resolver such as shown at 303 in FIG. **14*b* has two windings, R1–R3 and R2–R4, in its rotor, and these two windings are displaced 90° with respect to each other. The resolver also has two windings, S1–S3, and S2–S4, in its stator and these two windings are also placed at ninety degrees to each other. The rotor of the resolver 303 is capable of turning thru 360° with respect to its stator. The voltage generated in winding S1–S3 is proportional to the sum of 2 voltages: the voltage across winding R1–R3 times the cosine of the angle between windings S1–S3 and R1–R3 plus the voltage across winding R2–R4 times the cosine of the angle between S1–S3 and R2–R4. Likewise the voltage generated in winding S2–S4 is proportional to the sum of 2 voltages: the voltage across winding R1–R3 times the cosine of the angle between S2–S4 and R1–R3 plus the voltage across winding R2–R4 times the cosine of the angle between windings S2– S4 and R2–R4. Another way to visualize what the resolver 303 does is to consider the voltages in the two windings R1–R3 and R2–R4 as vectors which are added vectorally in the rotor to produce a single resultant voltage or vector. The two windings S1–S3 and S2–S4 each have induced in them a voltage proportional to the component of the resultant rotor vector in the directions of the stator windings. If the voltages in the two rotor windings remain constant while the rotor revolves with respect to the stator, the stator winding voltages will vary in a sinusoidal fashion as the rotor is turned, but the rotor positions for maximum voltage in winding S1–S3 will be 90° displaced from the rotor positions for maximum voltage in winding S2–S4. If now the magnetic resolver 303 is connected between the horizontal scan generator 142 and vertical scan generator 143 and the horizontal and vertical deflection plates 301*h* and 301*v* respectively of the scanner tube 302 as shown in FIG. 14*b*, and further if the rotor of the resolver 303 is driven by shaft 194, then the direction of the scan fields in scanner tube 302 will rotate at the same rate as shaft 194. Thus the resolver 303 driven by shaft 194 will produce the same results as rotation of magnetic deflection yoke 257 by shaft 294 in FIG. 14. The rotation of a magnetic deflection yoke 257 as shown in FIG. 14 and the use of a magnetic resolver which is rotated by a shaft as in FIG. 14*b*** are both well known techniques and both methods have been used, for example, in radar scopes of the PPI, or Plan-Position-Indicator, type.

Since certain changes may be made in the construction set forth and in carrying out the above method, and different embodiments of the invention may be provided without departing from the scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Pattern recognition apparatus, comprising, in combination: sensing means for sensing an area encompassing a graphic item to be identified along a plurality of scan lines of a first scanning pattern which encompasses said area to derive a first multi-bit electrical signal characteristic of said item encompassed within said area, and for sensing said area along a plurality of scan lines of a second scanning pattern which encompasses said area to derive a second multi-bit electrical signal characteristic of said item encompassed within said area; and recognition circuit means for comparing received signals simultaneously with each datum of a group of stored data representing characteristics of a plurality of known graphic items to provide an output signal identifying said graphic item to be identified, said recognition circuit means being connected to receive said first and second signals one after the other.

2. Apparatus according to claim 1 wherein said sensing means is operative to sense elemental areas along said scan lines of said first scanning pattern to derive a first group of serial signals and to sense elemental areas along said scan lines of said second scanning pattern to derive a second group of serial signals, and said sensing means includes means for processing said first group of serial signals to provide said first multi-bit electrical signal as a parallel signal and for processing said second group of signals to provide said second multi-bit electrical signal as a parallel signal.

3. Apparatus according to claim 1 wherein said second scanning pattern is geometrically different from said first scanning pattern.

4. Apparatus according to claim 1 wherein said second scanning pattern contains the same number of scan lines as said first scanning pattern.

5. Apparatus according to claim 1 wherein said sensing means is operative to provide said first multi-bit electrical signal at the completion of said first scanning pattern and thereafter to provide said second multi-bit electrical signal at the completion of said second scanning pattern, said recognition circuit means being operative upon receipt of said first multi-bit electrical signal to reject one or more of said stored data as differing from said data to be identified.

6. Pattern recognition apparatus for identifying a graphic item, comprising, in combination: first means for sensing an area encompassing said item along a plurality of lines to derive a first group of signals each representative of a respective portion of said item across which one or another of said lines extends; a signal-processing device connected to receive signals of said first group, and to combine a plurality of received signals representing respective plural portions of said item across which a plurality of said lines extend irrespective of which of said lines said plurality of received signals were derived along, to provide a further signal characteristic of said item; and recognition circuit means coded in accordance with characteristics of a plurality of known items operably responsive to said further signal.

7. Apparatus according to claim 6 wherein said first means is operable to sense along said lines successively, one line after another and to provide said first group of signals serially at an output terminal of said first means.

8. Apparatus according to claim 6 wherein said first means is operable to sense each portion of said item across which a given one of said lines extends irrespective of where said portions occur along said given one of said lines.

9. Apparatus according to claim 6 wherein said signal-processing device comprises temporary-storage means connected to receive signals of said first group while they are being derived by said first means and operable thereafter to provide said further signals as a parallel multi-bit signal.

10. Apparatus according to claim 6 wherein said signal-processing device comprises a plurality of cascaded stages having an input terminal connected to receive each of said signals of said first group.

11. Apparatus according to claim 6 wherein said further signal has a parameter which is substantially invariant with the translational location in two dimensions of said graphic item in said area, said recognition circuit means being responsive to said parameter of said further signal.

12. Apparatus according to claim 6 wherein said first means is operable after deriving said first group of signals to derive successive groups of signals characteristic of properties of said item, said signal-processing device is operative to receive said successive groups of signals and to provide a sequence of output signals, said recognition circuit means being responsive to said sequence of output signals.

13. Apparatus according to claim 6 wherein said signal-processing device comprises temporary-storage means for providing said further signal as a parallel multi-bit digital signal and wherein said recognition circuit means includes means for comparing said multi-bit digital signal with each of a plurality of stored data values characteristic of said known items to derive a plurality of analog correlation signals.

14. Apparatus according to claim 6 wherein said first means is operative to sense successive elemental areas along each of said lines at a predetermined speed.

15. Apparatus according to claim 6 wherein said recognition circuit means comprises means for comparing said further signal with stored data values characteristic of said known items.

16. Apparatus according to claim 15 wherein said recognition circuit means is operable to provide output signals indicating which of said stored data values correspond to said further signal within predetermined tolerances.

17. Apparatus according to claim 15 wherein said recognition circuit means is operable to provide output signals indicating which of said stored data values differ from said further signal by amounts exceeding predetermined tolerances.

18. Pattern recognition apparatus for identifying a graphic item, comprising, in combination: first means for sensing an area encompassing said item to derive a first group of signals collectively representative of the sensed portions of said item encompassed within said area; a temporary-storage signal-receiving device having an input terminal and a plurality of output terminals; means for applying each of said signals of said first group to said input terminal of said signal-receiving device; recognition circuit means coded in accordance with characteristics of a plurality of known items; and means for applying signals from said output terminals of said signal-receiving device to said recognition circuit means.

19. Pattern recognition apparatus for identifying a graphic item, comprising, in combination: first means for sensing an area encompassing said item to derive a first group of signals collectively representative of the sensed portions of said item encompassed within said area at an output terminal of said first means; a temporary-storage signal-receiving device having a plurality of output terminals; means for applying each of said signals of said first group from said output terminal of said first means to said signal-receiving device; recognition circuit means coded in accordance with characteristics of a plurality of known items; and means for applying signals from said output terminals of said signal-receiving device to said recognition circuit means.

20. Apparatus for identifying an unknown pattern contained within an area, comprising, in combination: sensing means for sensing portions of the unknown pattern wherever they occur in said area to provide electrical signals; signal-processing means including temporary storage means for receiving each of said electrical signals and for providing output signals; recognition circuit means coded in accordance with the characteristics of a plurality of known patterns; and means for applying output signals from said signal-processing means to said recognition circuit means which are substantially independent of the location in two dimensions of said unknown pattern within said area.

21. Apparatus for automatically identifying an unknown graphic item, comprising, in combination: means for sensing an area containing said item along a plurality of lines to derive a plurality of first signals from various of said lines, each of said first signals occurring from the interception of one or another of said lines with a portion of said graphic item; a temporary storage device having an input terminal connected to receive said first signals during the sensing of said plurality of lines and to provide thereafter an output signal which is characteristic of a combination of the received first signals but independent of whether a given one of said first signals occurred from a selected one of said lines or from a different one of said lines than said selected one of said lines; and means coded in accordance with characteristics of a plurality of known items and responsive to said output signal for identifying said unknown item.

22. Pattern recognition apparatus for identifying a graphic item encompassed within an area, comprising, in combination: first means for sensing said area encompassing said item to provide a first group of signals collectively representative of the sensed portions of said item encompassed within said area; a temporary-storage signal-receiving device connected to receive each of said signals and operative to provide a parallel multi-element signal characteristic of said item; and recognition circuit means coded in accordance with characteristics of a plurality of known items connected to receive said multi-element signal and indicate whether said parallel signal corresponds to a stored value within a finite tolerance.

23. Apparatus according to claim 22 wherein said recognition circuit means comprises a group of resistances connected to receive said multi-element signal and provide an analog current having a magnitude characteristic of the correlation between said graphic item and one of said known items, and means for indicating whether said analog current falls within a first range of values or a different range of values.

24. Apparatus according to claim 22 wherein said recognition circuit means is operable to compare said parallel multi-element signal simultaneously with each of plurality of stored data values representing said characteristics of said plurality of known items to detect which of said stored data values correspond to the value of said parallel multi-element signal within predetermined tolerances and which of said stored data values differ from the value of said parallel multi-element signal by more than said tolerances.

25. Apparatus according to claim 22 wherein said first means is operative to sense said area along a plurality of parallel lines extending across said area to detect elemental areas of said lines which cross portions of said item to provide said first group of signals, and said temporary-storage signal receiving device comprises a plurality of cascaded stages having an input terminal connected to receive signals of said first group derived from sensing along any of said lines.

26. The method of identifying a graphic item contained within a background area comprising the steps of sensing said area along a plurality of scan lines to derive a first plurality of signals; combining signals of said first plurality occurring from a group of scan lines to provide a data value characteristic of said item; and comparing said data value with stored values characteristic of known items to determine whether said data value corresponds to any of said stored values within a finite tolerance.

27. The method according to claim 26 wherein said step of combining signals of said first plurality is arranged to provide said data value characteristic of said graphic item at a value substantially independent of the translational location in two dimensions of said graphic item within said background area.

28. The method according to claim 26 wherein said step of sensing comprises sensing elemental areas along each of said scan lines to derive said first plurality of signals.

29. The method according to claim 26 wherein said step of sensing comprises detecting interceptions of said item by said scan lines to derive said first plurality of signals and said step of combining comprises counting said interceptions from a plurality of said scan lines to provide said data value.

30. The method according to claim 26 wherein said step of combining comprises combining signals occurring from further groups of plural scan lines to provide further data values each associated with a respective group of said scan lines, and said step of comparing comprises comparing said further data values with stored values characteristic of known items.

31. The method according to claim 26 wherein said step of sensing comprises scanning said area with a plurality of time-successive scan lines which progress one after the other across said area.

32. The method according to claim 26 wherein said step of combining comprises temporarily storing said first plurality of signals and providing a parallel multi-element signal representing said data value.

33. The method according to claim 26 wherein said step of sensing comprises detecting transitions between portions of said background area and portions of said graphic item occurring along said scan lines to derive said first plurality of signals.

34. The method according to claim 26 wherein said step of comparing comprises determining which of said stored values match said data value within predetermined finite tolerances and which of said stored values differ from said data value by amounts exceeding predetermined finite tolerances.

35. A method of classifying a graphic item comprising the steps of sensing an area encompassing said item to derive a serial electrical signal characteristic of the sensed portions of said item encompassed within said area, processing said serial electrical signal to provide a parallel electrical signal on a plurality of lines which is characteristic of said sensed portions of said item encompassed within said area, and determining a relationship between said parallel electrical signal and stored information characteristic of a set of known graphic items to classify said graphic item.

36. The method according to claim 35 wherein said sensing step comprises detecting the presence or absence of portions of said item along a plurality of lines extending across said area and said serial electrical signal includes signal portions representative of item portions sensed along said plurality of lines.

37. A method according to claim 35 wherein said sensing step comprises sensing said area during a plurality of successive time periods, said step of processing comprises providing a separate parallel electrical signal characteristic of the portion of said serial electrical signal derived during each of said time periods, and said method includes the step of determining a relationship between each separate parallel electrical signal and said stored information to classify said item.

38. The method of identifying an unknown symbol comprising the steps of sensing the interceptions of said symbol by a plurality of scan lines to provide electrical signals; storing said electrical signals in a format which is independent of which particular scan lines said interceptions occur in to provide a further electrical signal; and comparing said further electrical signal simultaneously with stored data representing a plurality of known symbols to provide an indication of said unknown symbol.

39. The method or recognizing an unknown pattern encompassed within an area substantially independently of its location within said area comprising the steps of sensing portions of said area with sensing means to derive an electrical signal representing a value of a property of said pattern which is substantially independent of the translational position in two dimensions of said pattern relative to said sensing means, comparing said electrical signal with a stored value of a similar property characteristic of a known pattern, and indicating a correspondence if the values for said known and unknown patterns have a predetermined relationship to each other.

40. The method according to claim 39 wherein said step of comparing comprises simultaneously comparing said electrical signal with a plurality of stored values of said similar property which are characteristic of a plurality of known patterns.

41. The method according to claim 39 wherein said step of sensing comprises scanning said portions of said area with a plurality of scan lines.

42. The method according to claim 39 including the step of temporarily storing sensed signals during the sensing of said portions of said area and thereafter providing said electrical signal.

43. The method according to claim 39 wherein said step of sensing includes the deriving of a sequence of values which are substantially independent of said translational position, and said step of comparing comprises successively comparing said values of said sequence with stored values characteristic of said known pattern.

44. Apparatus for distinguishing from a given surface area a symbol thereon of contrasting energy reflective property comprising in combination: scanning means for scanning said area sequentially in a plurality of different directions to provide a plurality of signals, each signal being associated with the scanning of said area in accordance with a particular direction and comprising a train of electrical pulses, means to count the pulses of each train to provide a plurality of numerical quantities, and signal-processing means responsive to said numerical quantities to indicate disparities between said numerical quantities and stored numbers, said stored numbers being characteristic of a known symbol.

45. Apparatus according to claim 44 wherein said signal-processing means includes means for indicating each of said numerical quantities which differs from a respective stored number quantity by an amount exceeding a predetermined tolerance.

46. Character recognition apparatus for identifying an unknown character encompassed within a background area, comprising, in combination: means for sensing said character and background area and providing a multi-bit digital signal pattern characteristic thereof in a plurality of binary digit stages; circuit means including a group of impedance means having different impedances each connected to a common terminal; means for selectively connecting signals from said stages to said group of impedance means to provide a current to said common terminal having a value characteristic of the degree of match of said unknown character to a known character; and comparison means responsive to the value of said current for identifying said unknown character.

47. Apparatus according to claim 46 wherein said means for sensing includes means for scanning elemental areas of said unknown character and background area with a plurality of scan lines which sweep individually and successively across said unknown character.

48. Apparatus according to claim 46 wherein said comparison means includes means for indicating whether said value of said current corresponds to a predetermined value within a selected tolerance.

49. Apparatus according to claim 46 wherein said plurality of binary digit stages are cascaded in a series string and said means for sensing includes scanning means for scanning progressively across said character and background area to provide successive signals to a first stage of said cascaded series string.

50. Apparatus according to claim 46 having further groups of impedance means with each group connected to a respective common terminal, said means for selectively connecting being operable to selectively connect said stages to each of said further groups of resistances, thereby to provide respective differing current values at said common terminals; and means for comparing said current values to identify said unknown character.

51. In reading apparatus; a sensing station including means for scanning characters to be read which are advanced past said station, the scanning means comprising means for scanning portions of a character in registration with said sensing station with a plurality of differently oriented scanning patterns; means comprising detecting means for producing signals when the scanning means senses portions of the character, said signals being of a duration proportional to the length of the portion sensed; and means for combining signals produced by said detecting means for providing an output signal indicative of the character scanned at the completion of all of said scanning patterns.

52. Apparatus according to claim 51 wherein the last-recited means comprises storage means for accumulating said signals to provide a plurality of further signals each characteristic of the signals produced by said detecting means from a respective one of said scanning patterns, and means coded in accordance with the characteristics of a plurality of known characters and responsive to said further signals for providing an output signal indicative of the character scanned.

53. Apparatus according to claim 51 wherein said means for scanning comprises a flying spot scanner.

54. Apparatus according to claim 51 wherein said means for combining signals is operative to combine signals produced by scanning portions of said character of at least one or more predetermined lengths.

55. Apparatus according to claim 52 including timing means for producing timing signals, said means for scanning being connected to be controlled by said timing means to scan said character with said differently oriented scanning patterns in successive periods of time; and sampling means controlled by said timing means for applying said further signals from said storage means to said coded means.

56. A data handling circuit in combination with character scanning apparatus comprising means for scanning a character in a plurality of sweeps which advance successively across the character, means including detector means responsive to the sensing of portions of said character by the scanning means for producing output signals, accumulator means connected to the second-mentioned means for accumulating said output signals, means synchronized by said scanning means for periodically producing a reset signal after a predetermined number of sweeps, said accumulator means being connected to receive said reset signal and to be reset thereby, and means connected to said accumulator means for indicating whether a predetermined count of said output signals is reached in said accumulator means during said predetermined number of sweeps.

57. Apparatus according to claim 56 in which said accumulator means comprises an electronic pulse counter including a plurality of cascaded trigger stages.

58. A data handling circuit in combination with character scanning apparatus, comprising: means for scanning a character with a scanning beam in a plurality of successive sweeps which advance one after the other across the character; means including detector means responsive to the sensing of portions of said character by said scanning beam for producing signals; accumulator means connected to the second-mentioned means for receiving said signals and accumulating them over a number of sweeps; and output circuit means connected to said accumulator means, said output circuit means being operative to provide an output signal after the termination of a predetermined time interval if said accumulator means has received a predetermined quantity of signals during said predetermined time interval.

59. Apparatus according to claim 58 wherein said output circuit means comprises means for comparing the signal count reached in said accumulator means from a predetermined group of sweeps with a stored count value, and character-identifying means responsive to said comparison for providing an output signal.

60. A data handling circuit according to claim 58 wherein said successive sweeps advance over successive portions of an area containing said character with a predetermined sweep speed and with each sweep beginning at a predetermined time during said predetermined time interval.

61. A data handling circuit in combination with character scanning apparatus comprising means for scanning a character in a plurality of successive scans which advance one after the other across the character, means including detector means responsive to the sensing of portions of said character by the scanning means for producing output signals, accumulator means connected to receive and accumulate said output signals, character-identifying means, and means for periodically connecting the data stored in said accumulator means after a predetermined number of scans to said character-identifying means.

62. In a character recognition system the combination comprising scanning means for scanning a field which includes a character to be recognized, control means controlling said scanning means to define a criterion scan area on said field, said criterion scan area being defined by a predetermined number of successive scans of said scanning means each separated from the other a predetermined distance, pick-up means providing a signal pulse when any of said scans traverses a mark on said field, means for counting said signal pulses, and means providing an output signal when a predetermined number of said pulses are counted by said counting means.

63. The method of classifying a symbol comprising the steps of performing a first scanning of said symbol with a first plurality of scan lines to provide a first parallel multi-bit signal characteristic of said symbol; performing a second scanning of said symbol encompassing an area of said symbol also scanned during said first scanning to provide a second parallel multi-bit signal characteristic of said symbol; comparing said first multi-bit parallel signal with first stored data; comparing said second multi-bit parallel signal with second stored data and collectively processing the results of the two comparisons to classify said symbol.

64. The method of identifying an unknown character contained within an area as one of a set of characters comprising the steps of scanning said area containing said character with a sequence of successive scan lines to produce a single time-varying waveform; converting said single time-varying waveform to a parallel multi-bit digital signal; applying said multi-bit digital signal to a multiplicity of correlation networks to derive a multiplicity of analog signals each varying in magnitude as a function of the degree of match between said character to be identified and a respective character of said set; and comparing each of said analog signals with a predetermined value using a tolerance to provide an identification of said unknown character.

65. In an apparatus for evaluating symbols printed on documents, the combination comprising: transducer means for scanning a given symbol on one of said documents and for producing in response thereto a plurality of time-varying voltage signals each characteristic of said symbol, each of said voltage signals having a peak amplitude dependent upon the degree of match between said given symbol and a respective symbol of a set of symbols; means for comparing the peak level of at least one of said voltage signals with a reference signal level, said means for comparing being coupled to said transducer means; and means for rejecting said given symbol if said peak level of said one of said voltage signals varies from said reference level by more than a predetermined tolerance.

66. Character recognition apparatus comprising means for scanning a character to be identified to provide an electrical signal characteristic of said character; a plurality of correlation means each associated with a respective character of a set of characters; means for applying said electrical signal to each of said correlation means, each of said correlation means providing an output signal which varies from a reference value as a function of the degree of match between the character scanned and a respective character of said set; and threshold-responsive means operated by those of said output signals which vary from said reference value beyond selected tolerances.

67. The method of identifying a symbol contained within a background area comprising the steps of scanning said symbol with a predetermined number of scan lines which encompass said background area and cross said background area in a plurality of different directions, sensing and totalizing interceptions of said symbol by said scan lines, and comparing totals of said interceptions with stored data to identify said symbol.

68. In a system for recognizing each of a plurality of different symbols, apparatus comprising: means for scanning areas which encompass individual ones of said symbols to provide respective waveforms, each of said waveforms being characteristic of the area encompassing a respective one of said symbols; a plurality of networks equal in number to the number of different waveforms, each of said networks being associated with a respective one of said waveforms; temporary storage means having an input terminal for receiving any one of said waveforms and a plurality of output terminals for delivering a plurality of discrete signals collectively characteristic of the symbol scanned; a current summing means in each network; and switch-selected impedance means in each network connected between certain of said output terminals and the current-summing means of its respective network, the impedance characteristics of each said impedance means being selected in accordance with a characteristic of a respective one of said different symbols.

69. The system according to claim 68 having comparison means for receiving and comparing the currents from each of said current summing means to recognize the waveform received by said temporary storage means.

70. Apparatus for reading intelligence-bearing characters, comprising, in combination: scanning means for producing a signal which is characteristic of a character contained within a scanning field but substantially independent of the translational location in two directions of said character relative to said scanning field during the scanning of said character, and interpreter means coded in accordance with the corresponding characteristic of each of a vocabulary of reference characters for receiving said signal and for producing an output signal descriptive of the character scanned.

71. Apparatus according to claim 70 wherein said scanning means comprises means for sensing elemental areas of said scanning field to provide a first group of signals, and temporary storage means for combining signals of said first group to provide said signal characteristic of said character.

72. Apparatus according to claim 71 having timing means for producing timing signals, said scanning means being controlled by said timing signals to scan said character with a plurality of time-successive scanning lines to provide said first group of signals, and said temporary storage means being controlled by said timing means to provide said signal characteristic of said character.

73. Apparatus according to claim 72 in which said scanning means includes a cathode ray tube; first and second sweep generating means controlled by said timing means and operative to control the scanning of the beam of said cathode ray tube; and photo-sensitive means actuated by variations in the light from said beam reflected by said character during scanning for providing said group of signals.

74. Apparatus for recognizing each of a plurality of different characters, comprising, in combination: means for scanning an area encompassing any one of said characters and for providing an electrical signal characteristic of the scanned area; means including temporary storage means for receiving said signal serially as said area is scanned and at a time thereafter providing a first plurality of signals simultaneously, said first plurality of signals being collectively characteristic of both said electrical signal and said scanned area; a plurality of comparison channels, each channel being coded in accordance with a predetermined characteristic of a respective one of said plurality of different characters and including a plurality of sampling circuit means, each of said sampling circuit means being arranged to connect a respective group of said first plurality of signals to a respective one of said comparison channels, each of said comparison channels being adapted to provide an output signal falling within a first range of values when the character scanned corresponds to the channel and falling within a different range of values when the character scanned does not correspond to that channel.

75. Apparatus according to claim 74 wherein the output signal provided by each of said comparison channels comprises an analog output signal which varies in magnitude in accordance with the correlation between the character scanned and the respective character coded in the respective channel; and wherein said apparatus includes a plurality of character-identifying indicating means switchable between mutually-opposite first and second conditions, each of said indicating means being responsive to a respective one of said analog output signals, that indicating means having a condition opposite to that of the others of said indicating means identifying the character scanned.

76. Apparatus for classifying characters, comprising, in combination: means for scanning a character; means responsive to said scanning means for producing output signals when said scanning means senses portions of said character; register means for storing said output signals; means for sequentially transferring stored output signals from said register means to computing means, said computing means being programmed in accordance with characteristics of a group of known characters and being operable to provide respective correlation signals representative of the correlation between characters scanned and the known characters programmed in said computing means; and means responsive to the magnitudes of said correlation signals for selecting one of said correlation signals and identifying the character scanned.

77. Apparatus according to claim 76 wherein said computing means includes a plurality of adding resistor circuits each programmed in accordance with a predetermined characteristic of a respective known character of said group to provide a respective one of said correlation signals.

78. Apparatus according to claim 76 wherein said means responsive to the magnitudes of said correlation signals for selecting one of said correlation signals is operative to select said one of said correlation signals if the magnitude of said one of said correlation signals does not differ from a reference value by more than a selected tolerance.

79. Apparatus according to claim 76 wherein at least one of the stored output signals transferred to said computing means has a parameter which is substantially invariant with the location in two directions of the character within a background area scanned by said means for scanning, and wherein said computing means is responsive to said parameter of said one of said stored output signals.

80. Apparatus for providing automatically an electrical identification of human language symbols, comprising: means for sensing an area encompassing one of said symbols to generate electrical signals characteristic of the sensed area of said symbol, said electrical signals being substantially independent of the translational location in two dimensions of said symbol within said area; a plurality of data storage channels each programmed to store data representing signals generated by said means for sensing in response to a respective one of said symbols to be identified; correlating means for correlating the signals generated in response to a symbol with the data stored in each of said data storage channels; and means for coupling said correlating means to receive the signals generated by said means for sensing.

81. Apparatus according to claim 80 wherein said means for sensing includes temporary storage means operative to provide said electrical signals.

82. In apparatus for recognizing each of a plurality of different wave shapes, means for receiving any one of said different wave shapes and for resolving said wave shape into a plurality of successive temporal portions to provide a plurality of successive output signals each characteristic of a respective temporal portion of said wave shape, said means including digital integrating means, said integrating means being operable to integrate respective ones of said successive temporal portions between the limits of its respective temporal portion to provide said output signals each commensurate with the integral of its respective temporal portion, whereby the output signals of said integrating means provide a pattern characteristic of said wave shape.

83. Apparatus according to claim 82 in which said apparatus also includes means for comparing said output signals each with a respective stored signal representing the integral of a temporal portion of a known wave shape.

84. Apparatus according to claim 82 having means for comparing the output signals of said integrating means with stored data characteristic of known wave shapes; and indicating means responsive to said means for comparing for providing an output signal having a pattern identifying said wave shape.

85. A recognition system including the combination of means for deriving statistical information from a thing to be identified, means generating an electrical signal in response to the derived statistical information, a probability determining circuit coupled to said signal generating means, said probability determining circuit comprising a matrix of elements each having an electrical characteristic corresponding to a probability that the electrical signal represents one of a plurality of things, a plurality of output circuits coupled to said matrix, each corresponding to one of said plurality of things, and signal-applying means coupled between the matrix and the output circuits for providing output signals indicative of a probability that the derived statistical information represents a particular one of said plurality of things based upon a composite probability derived by application to said output circuits by said signal-applying means of electrical signals passed by said matrix.

86. A system according to claim 85 wherein said plurality of output circuits includes means for selecting the output signal having the highest probability that the derived statistical information represents a particular one of said plurality of things by comparing at least one of said signals passed by said matrix with a stored value using a tolerance.

87. A system according to claim 85 wherein said signal-applying means is operative to apply to each of said output circuits a sequence of signals each indicative of a conditional probability that the derived statistical information represents a respective one of said plurality of things.

88. A recognition system according to claim 85 in which said means generating an electrical signal comprises means for scanning said thing to be identified with a plurality of different scanning patterns.

89. A recognition system according to claim 85 in which said matrix of elements comprises a plurality of resistances.

90. A recognition system according to claim 85 wherein said thing to be identified comprises an alphanumeric character situated within a background area, and said means generating said electrical signal comprises means for sensing said character to provide an electrical signal having a parameter which is substantially invariant with the translational location in two directions of said character within said area, said probability determining circuit being responsive to said parameter of said electrical signal.

91. A recognition system including the combination of means for deriving statistical information from a thing to be identified, means for converting said derived statistical information into a plurality of successive parallel digital signals, a probability-determining circuit coupled to receive said successive parallel digital signals, said probability-determining circuit comprising a plurality of elements each having an electrical characteristic corresponding to a probability that one of said parallel digital signals represents a respective one of a plurality of things and each being adapted to provide successive analog output currents which vary in magnitude in accordance with said probability, means for combining said successive analog output currents to provide a plurality of output signals each indicative of a probability that the thing to be identified represents a respective one of said plurality of things, and comparison means responsive to the magnitudes of said output signals for providing an indication that said derived statistical information represents a unique one of said plurality of things.

92. Apparatus for identifying a graphic item, comprising, in combination: sensing means for sensing portions of an area encompassing said item and producing signals collectively characteristic of said item; register means connected to receive said signals and to provide therefrom a multi-bit pattern of digital signals which is representative of a relationship between portions of said item relative to each other and which is substantially independent of the translational location in two dimensions of said item within said area; programmed circuit means responsive to a predetermined digital signal pattern provided by said register means for recognizing a characteristic of items to be identified which is represented by said pattern and for providing a further signal; and output means responsive to said further signal for providing an output signal descriptive of the item scanned.

93. Apparatus according to claim 92 wherein said sensing means comprises means for scanning said area with successive lines of scanning and sensing intercepts of portions of said item with elemental areas comprising each scanning line to produce signals dependent upon occurrence or absence of said intercepts which are collectively characteristic of said item, wherein said register means is operative to provide further multi-bit patterns of digital signals at successive times during the scanning of said item, said programmed circuit means is responsive to said further multi-bit patterns of digital signals and operative to provide successive further signals, said output means being controlled by both said further signal and said successive further signals.

94. Apparatus according to claim 92 in which said sensing means comprises photosensor means, said register means comprises a multiplicity of cascaded stages, and said programmed circuit means comprises a plurality of networks, each of said networks including a plurality of scaling resistances and providing an analog output signal having a magnitude which varies a function of the degree of match between said item and a stored pattern representing a respective known item.

95. Apparatus according to claim 92 wherein said sensing means is operative to sense said area along a plurality of parallel lines extending across said area and provide a signal denoting each interception of said item along any of said lines, said lines including a first line, a last line, and a plurality of intermediate lines spaced between said first and last lines, and wherein said register means is operable to store each of said signals in a format which is independent of the location of the interception causing the signal relative to the beginning and ending of the line along which the interception occurred, and which is independent of the spacing of the line along which the interception occurred relative to said first and last lines.

96. Character recognition apparatus, comprising, in combination: means for scanning characters to be identified to provide for each character to be identified a time-varying first signal comprising a serial sequence of electrical signal pulses; serial-to-parallel conversion means responsive to each said serial sequence of electrical signal pulses and operable to provide a first parallel multi-bit digital electrical signal, said conversion means including a digital temporary storage means; a multiplicity of matching circuits, each of said matching circuits being associated with a respective character of a set of characters said apparatus is designed to recognize; means for applying each said first parallel multi-bit digital electrical signal to each of said matching circuits, each of said matching circuits having an electrical characteristic for providing, upon receipt of each said first parallel multi-bit digital electrical signal, a first respective analog output signal having a magnitude which varies as a function of the degree of match between the character scanned and its respective associated character of said set; and comparison means responsive to said first analog output signals from said matching circuits for determining if said analog output signals do not differ from reference values by more than a tolerance for providing an indication of the character scanned.

* * * * *

US003713099A

REEXAMINATION CERTIFICATE (1957th)

United States Patent [19]
[11] B1 3,713,099
Hemstreet
[45] Certificate Issued Mar. 30, 1993

[54] METHOD AND APPARATUS FOR IDENTIFYING LETTERS, CHARACTERS, SYMBOLS AND THE LIKE

[75] Inventor: Harold S. Hemstreet, P.O. Box 438, Rye Beach, N.H.

[73] Assignee: Harold S. Hemstreet, Wilton, Conn.

Reexamination Requests:
No. 90/001,049, Jul. 2, 1986
No. 90/002,037, Jun. 4, 1990

Reexamination Certificate for:
Patent No.: 3,713,099
Issued: Jan. 23, 1973
Appl. No.: 831,599
Filed: Aug. 4, 1959

Related U.S. Application Data

[62] Division of Ser. No. 336,080, Feb. 10, 1953, U.S. Pat. No. 3,713,100.

[51] Int. Cl.[5] ........ G06K 9/68

[52] U.S. Cl. ........ 382/34; 382/18; 382/30; 340/825.34

[58] Field of Search ........ 382/10, 30, 34, 18

[56] References Cited

U.S. PATENT DOCUMENTS

| | | | |
|---|---|---|---|
| 2,518,694 | 8/1950 | Jannopoulo | 250/208 |
| 2,615,992 | 10/1952 | Flory et al. | 179/100.3 |
| 2,616,983 | 11/1952 | Zworykin | 179/100.3 |
| 2,663,758 | 12/1953 | Shephard | 178/17 |
| 2,679,636 | 5/1954 | Hillyer | 340/149 |
| 2,682,043 | 6/1954 | Fitch | 340/147 |
| 2,894,247 | 7/1950 | Relis | 340/149 |
| 2,947,971 | 8/1960 | Glauberman et al. | 340/149 |

FOREIGN PATENT DOCUMENTS

| | | |
|---|---|---|
| 650536 | 2/1951 | United Kingdom . |
| 781931 | 8/1957 | United Kingdom . |

OTHER PUBLICATIONS

Zworykin-Flory-Pike articles "Letter Reading Machine", *Electronics*, Jun. 1949, pp. 80-86.
R. C. Kelner & M. H. Glauberman article "Magnetic Shift-Register Correlator", *Electronics*, Aug. 1956, pp. 172-175.

*Primary Examiner*—Joseph Mancuso

EXEMPLARY CLAIM

Character recognition apparatus, comprising, in combination: means for scanning characters to be identified to provide for each character to be identified a time-varying first signal comprising a serial sequence of electrical signal pulses; serial-to-parallel conversion means responsive to each said serial sequence of electrical signal pulses and operable to provide a first parallel multi-bit digital electrical signal, said conversion means including a digital temporary storage means; a multiplicity of matching circuits, each of said matching circuits being associated with a respective character of a set of characters said apparatus is designed to recognize; means for applying each said first parallel multi-bit digital electrical signal to each of said matching circuits, each of said matching circuits having an electrical characteristic for providing, upon receipt of each said first parallel multi-bit digital electrical signal, a first respective analog output signal having a magnitude which varies as a function of the degree of match between the character scanned and its respective associated character of said set; and comparison means responsive to said first analog output signals from said matching circuits for determining if said analog output signals do not differ from reference values by more than a tolerance for providing an indication of the character scanned.

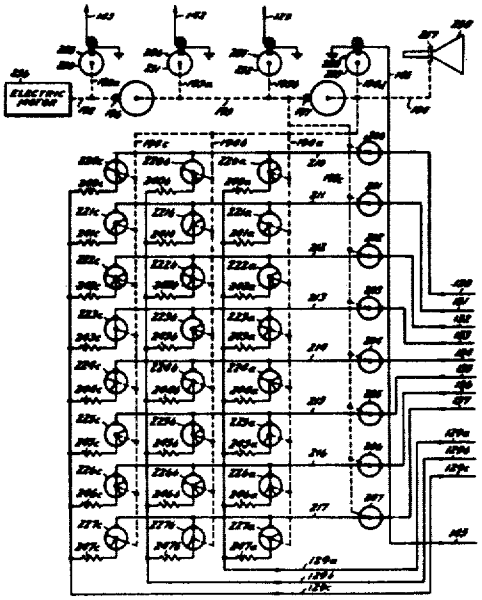

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-5, 11-13, 15-17, 20-73, 75-84, 88, 90 and 92-96 is confirmed.

Claims 6-10, 14, 18, 19, 74, 85-87, 89 and 91 are cancelled.

* * * * *